(12) United States Patent
Itoyama et al.

(10) Patent No.: US 6,705,303 B2
(45) Date of Patent: Mar. 16, 2004

(54) AIR-FUEL RATIO CONTROL APPARATUS AND METHOD FOR INTERNAL COMBUSTION ENGINE

(75) Inventors: Hiroyuki Itoyama, Yokohama (JP); Hiroshi Iwano, Kanagawa (JP); Kensuke Osamura, Kanagawa (JP); Kenji Oota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 109 days.

(21) Appl. No.: 10/093,914

(22) Filed: Mar. 11, 2002

(65) Prior Publication Data

US 2002/0139361 A1 Oct. 3, 2002

(30) Foreign Application Priority Data

Mar. 27, 2001 (JP) ......................... 2001-090966

(51) Int. Cl.⁷ ..................... F02M 25/07; F02D 41/04
(52) U.S. Cl. ................... 123/698; 123/568.21
(58) Field of Search .................. 123/698, 568.21, 123/568.11, 568.12, 568.29; 701/108; 60/605.2

(56) References Cited

U.S. PATENT DOCUMENTS

| | | | | |
|---|---|---|---|---|
| 4,380,988 A | * | 4/1983 | Otsuka et al. | 123/698 |
| 4,640,257 A | * | 2/1987 | Kodama et al. | 123/698 |
| 5,209,214 A | * | 5/1993 | Ikuta et al. | 123/698 |
| 5,570,673 A | * | 11/1996 | Isobe | 123/688 |
| 6,058,701 A | | 5/2000 | Mashiki | |
| 6,176,227 B1 | * | 1/2001 | Ohuchi et al. | 123/698 |

FOREIGN PATENT DOCUMENTS

| JP | 63-94061 | 4/1988 |
|---|---|---|
| JP | 10-220304 | 8/1998 |

\* cited by examiner

Primary Examiner—Tony M. Argenbright
Assistant Examiner—Hyder Ali
(74) Attorney, Agent, or Firm—Foley & Lardner

(57) ABSTRACT

In air-fuel ratio control apparatus and method for an internal combustion engine having an EGR valve interposed in an EGR passage between an intake manifold and an exhaust manifold, a target EGR quantity is calculated, a determination is made which of air-fuel ratio feedback controls through an EGR control and through an intake-air quantity is to be executed according to the target EGR quantity, and one of the air-fuel ratio feedback controls is selectively made according to a result of a determination of which of the air-fuel feedback controls is to be executed. During an execution of a rich spike control, the feedback control through the intake-air quantity control is unconditionally executed.

20 Claims, 20 Drawing Sheets

INTAKE-AIR QUANTITY DETECTION FLOW

VOLTAGE-FLOW QUANTITY CONVERSION TABLE

TARGET EGR RATE CALCULATION FLOW

BASIC TARGET EGR RATE MAP (EXAMPLE)

TARGET EGR RATE COOLANT TEMPERATURE
CORRECTION COEFFICIENT TABLE (EXAMPLE)

EGR FLOW VELOCITY-CALCULATION FLOW

FLOW VELOCITY MAP SETTING EXAMPLE

FEEDBACK CONTROL SELECTION FLOW (1)

TARGET INTAKE-AIR QUANTITY CALCULATION FLOW (1)

TARGET INTAKE-AIR QUANTITY MAP SETTING EXAMPLE

EGR FEEDBACK CALCULATION FLOW

EGR VALVE OPENING AREA CALCULATION FLOW

EGR VALVE OPENING AREA-DRIVE SIGNAL CONVERSION TABLE (EXAMPLE)

TVO FEEDBACK CALCULATION FLOW

INTAKE THROTTLE VALVE OPENING ANGLE SETTING FLOW

MAXIMUM WORKING GAS
QUANTITY TABLE (EXAMPLE)

INTAKE-AIR QUANTITY RATIO
CONVERSION TABLE (EXAMPLE)

THROTTLE VALVE OPENING ANGLE
CONVERSION TABLE (EXAMPLE)

FEEDBACK CALCULATION FLOW OF VNT

TURBO CHARGER CONTROL FLOW

TARGET VNT DUTY SETTING EXAMPLE

RICH SPIKE FLAG SETTING FLOW

TARGET INTAKE-AIR QUANTITY CALCULATION FLOW (2)

FEEDBACK CONTROL SELECTION FLOW (2)

FEEDBACK CONTROL SELECTION FLOW (3)

AIR-FUEL RATIO CONTROL APPARATUS AND METHOD FOR INTERNAL COMBUSTION ENGINE

BACKGROUND OF THE INVENTION

1. Field of the Invention

The present invention relates to air-fuel ratio control apparatus and method for an internal combustion engine and, more particularly, relates to a technique for improving a control accuracy of an air-fuel ratio when an EGR (Exhaust Gas Recirculation) control is used together with a normal air-fuel ratio feedback control such as an intake-air quantity control.

2. Description of the Related Art

A Japanese Patent Application First Publication No. Showa 63-94061 published on Apr. 25, 1988 exemplifies a previously proposed air-fuel ratio control apparatus in which Exhaust Gas Recirculation (EGR) control valve is disposed within an EGR passage which links between an intake-air passage and an exhaust gas passage for controlling an EGR gas quantity so that an opening degree of the EGR valve or a valve opening rate thereof is feed-back controlled to make the air-fuel ratio substantially equal to a target air-fuel ratio (or so called, a stoichiometric air-fuel ratio).

That is to say, in the same engine driving condition, an opening degree of the EGR valve is modified to increase or decrease the EGR gas quantity. At this time, a fresh air quantity is decreased or increased by a quantity corresponding to the modification of the opening degree of the EGR valve so that the air-fuel ratio can be modified. Thus, the air-fuel ratio is controlled to be made substantially equal to the target air-fuel ratio. In a case where an intake-air quantity (the fresh air quantity) is directly controlled to achieve the air-fuel ratio feedback control, the fresh air quantity is caused to be varied. At this time, an EGR quantity is accordingly varied so as to satisfy a target EGR rate. Thus, the fresh air quantity is, in turn, varied. Consequently, the air-fuel ratio is deviated from the target air-fuel ratio. Therefore, a delay occurs in a convergence of the air-fuel ratio into the target air-fuel ratio. However, when the air-fuel ratio feedback control is performed through the EGR control, a quick convergence of the air-fuel ratio into the target air-fuel ratio can be achieved since no re-adjustment for the EGR rate is needed.

However, if a control over the opening degree of the EGR valve based on the air-fuel ratio varied due to an intake-air ripple or engine rotation variation is performed, the opening degree of the EGR valve is varied and the EGR gas quantity is accordingly varied. Consequently, a divergence of the air-fuel ratio from the target air-fuel ratio may occur.

To avoid such a divergence of the air-fuel ratio as described above, another air-fuel ratio control apparatus has previously been proposed according to a Japanese Patent Application First Publication No. Heisei 10-220304 published on Aug. 18, 1998. In the above-described other previously proposed air-fuel ratio control apparatus, the opening degree of the EGR valve is controlled on the basis of a smoothed air-fuel ratio obtained by smoothing the detected air-fuel ratio. Thus, the variation in the opening degree of the EGR valve is reduced. In addition, the smoothed air-fuel ratio is calculated using a smoothing coefficient defined according to the opening degree of the EGR valve. The opening degree of the EGR valve is controlled on the basis of the smoothed air-fuel ratio. Hence, while a response characteristic of the opening degree of the EGR valve is secured, the air-fuel ratio is made substantially equal to the target air-fuel ratio with a favorable convergence characteristic.

SUMMARY OF THE INVENTION

However, since, in the air-fuel ratio feedback control performed through the EGR control as in the former previously proposed air-fuel ratio control apparatus, a change rate of an EGR controlled variable used for the air-fuel ratio feedback control to the EGR rate, in a small region of the EGR rate, is relatively large, the air-fuel ratio feedback control through the EGR control cannot achieve a control of the EGR rate to an appropriate EGR rate.

In addition, although some other previously proposed air-fuel ratio control apparatuses perform the air-fuel ratio feedback control through the EGR control so as to maintain a relationship between the EGR rate and air-fuel ratio (air excess factor) constant, the constant relationship cannot be established over a whole control region. Hence, if, for example, the air-fuel ratio feedback control is performed through the EGR control to achieve the target air-fuel ratio (a target air excess factor) during an acceleration including a moderate acceleration, a target value of the EGR rate cannot be achieved.

Furthermore, in a still another previously proposed air-fuel ratio control apparatus in which a rich spike control such that the air-fuel ratio is controlled to be rich in order to reduce NOx adsorbed onto an NOx trap catalyst by HC in the exhaust gas to regenerate the catalyst, the NOx trap catalyst being disposed to adsorb NOx thereonto is carried out, it is necessary to control accurately the EGR rate and air-fuel ratio to satisfy both of a stability of fuel combustion and an exhaust gas purification performance during an execution of the rich spike control. However, if the air-fuel ratio feedback control is performed through the EGR control, the EGR controlled variable becomes excessively large or, on the contrary, becomes excessively small so that an instability of fuel combustion and a reduction in the exhaust gas purification may occur.

It is, therefore, an object of the present invention to provide improved air-fuel ratio control apparatus and method for an internal combustion engine which can effectively execute the air-fuel ratio feedback control through the EGR control so as to achieve highly accurate EGR control and air-fuel ratio control with favorable response and convergence characteristics while avoiding possibilities of occurrences in both of the instability of fuel combustion and the reduced exhaust gas purification performance.

According to one aspect of the present invention, there is provided with an air-fuel ratio control apparatus for an internal combustion engine having an EGR valve interposed in an EGR passage between an intake manifold and an exhaust manifold, comprising: a target EGR quantity calculating section that calculates a target EGR quantity; a control execution determining section that determines which of air-fuel ratio feedback controls through an EGR control and through an intake-air quantity is to be executed according to the target EGR quantity; and a control execution section that selectively executes one of the air-fuel ratio feedback controls according to a result of a determination by the control execution determining section.

According to another aspect of the present invention, there is provided air-fuel ratio control method for an internal combustion engine having an EGR valve interposed in an EGR passage between an intake manifold and an exhaust manifold, comprising: calculating a target EGR quantity;

determining which of air-fuel ratio feedback controls through an EGR control and through an intake-air quantity is to be executed according to the target EGR quantity; and selectively executing one of the air-fuel ratio feedback controls according to a result of a determination of which of the air-fuel feedback controls is to be executed.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
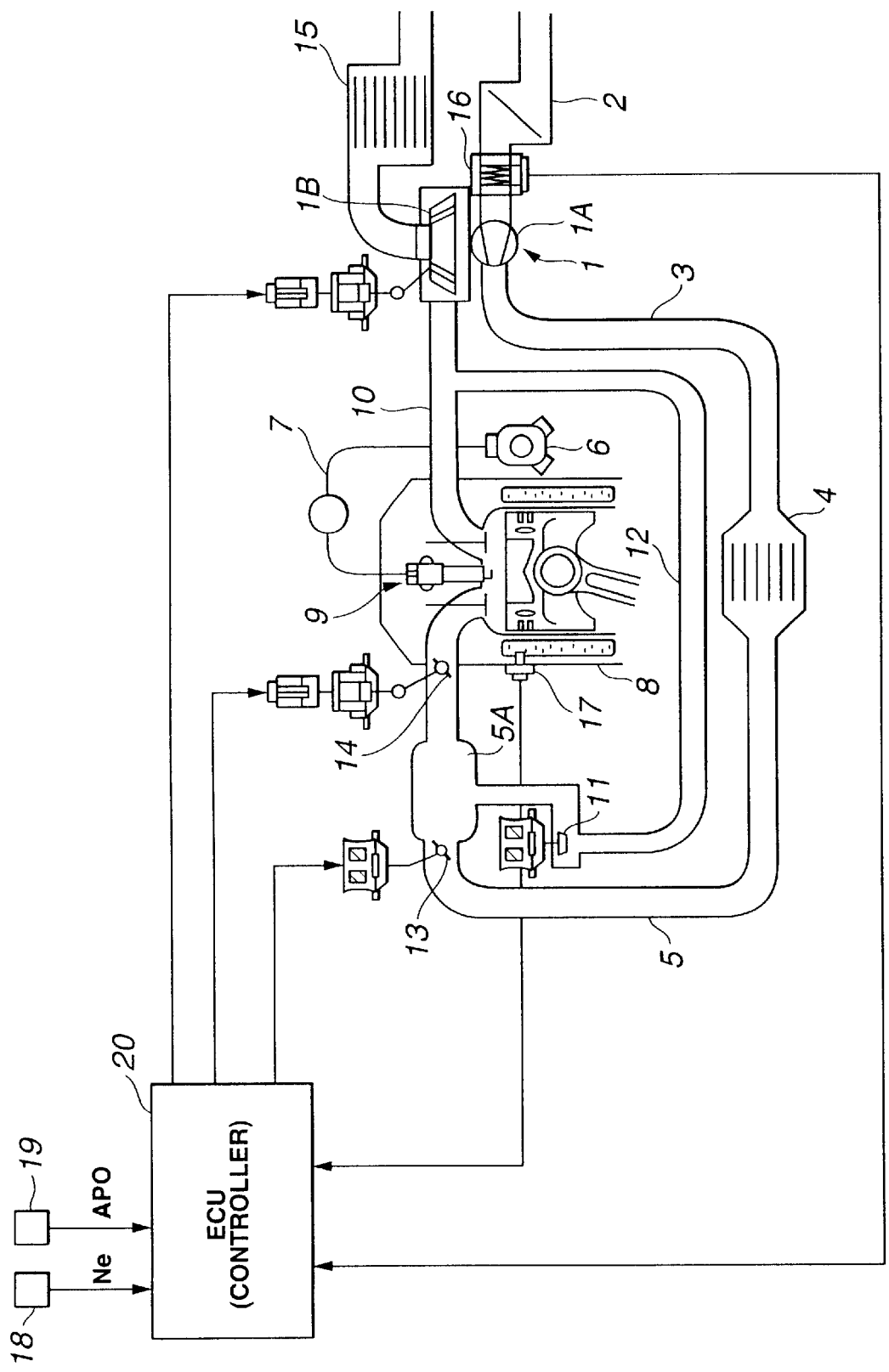
FIG. 1 is a schematic block diagram of a rough configuration of an internal combustion engine to which a first preferred embodiment of an air-fuel control apparatus according to the present invention is applicable.

FIG. 1 shows a system configuration of an air-fuel ratio control apparatus for an internal combustion engine in a first preferred embodiment according to the present invention. It is noted that the system configuration shown in FIG. 1 is applicable to each of second, third, and fourth preferred embodiments to be described later.

In FIG. 1, a turbo charger 1 includes an intake-air compressor 1A with which an intake-air whose dust is eliminated by an air cleaner 2 and sucked into an intake airpassage 3 is compressed and super-charged. Then, the compressed and super-charged intake-air is cooled by means of an inter-cooler 4 and, thereafter, is supplied to an intake manifold 5 located at a downstream side of inter-cooler 4.

On the other hand, fuel supplied from a supply pump 6 under a high pressure is reserved under the high pressure via a common rail 7 and is injected toward a fuel combustion chamber from a fuel injection valve (a fuel injector) 9 installed within a combustion chamber of each engine cylinder of an engine 8. The injected fuel is, then, ignited and burned in the combustion chamber. In addition, an EGR (Exhaust Gas Recirculation) passage 12 in which an EGR valve (also called, EGR control valve) 11 is interposed is connected between an exhaust manifold 10 and a collector portion 5A of intake manifold 5. An electronically controlled throttle valve 13 (an intake throttle valve whose opening degree is driven to be opened or closed by an associated actuator such as an electric motor) is interposed at an upstream side of intake-air compressor 1A of intake-air passage 3. Such an EGR control as controlling an opening degree of EGR valve 11 is executed at the same time as throttling intake throttle valve 13 in order to improve an emission of exhaust gas and to countermeasure noises, mainly, during an engine idling and during a low engine load.

A swirl control valve (SVC) 14 is disposed on an intake port located at the downstream side of throttle valve 13 and branched into each cylinder of engine 8. A throttled variable of swirl control valve 14 is controlled according to an engine driving condition to form an appropriate swirl within the combustion chamber. Exhaust gas in exhaust manifold 10 developed after a combustion serves to rotationally drive an exhaust turbine 1B of turbo charger 1 and, thereafter, NOx (Nitrogen Oxides) component of exhaust gas is trapped by means of an NOx trap catalyst 15. Exhaust gas is, thereafter, is discharged into the air. It is noted that exhaust turbine 1B is of a variable nozzle type and a turbo charge pressure of turbo charger 1 can variably be controlled by adjusting a nozzle opening degree of the variable nozzle of exhaust turbine 1B.

Various sensors to detect the engine driving condition includes: an airflow meter 16 to detect an intake-air quantity; a coolant temperature sensor 17 to detect an engine coolant temperature TW; an engine speed sensor 18 to detect an engine speed Ne; and an accelerator opening degree sensor 19 to detect a manipulated variable APO of an accelerator pedal. Detection signals from the sensors are inputted into a controller (electronic control unit (ECU)) 20. Controller 20 performs the EGR control, a fuel injection control (air-fuel ratio control), and a swirl control according to the engine driving condition detected on the basis of each detection signal. It is noted that, in the case of the present invention, controller 20 performs an air-fuel ratio feedback control according to an EGR control state. It is also noted that controller 20 includes a microcomputer having a CPU (Central Processing Unit), a ROM (Read Only Memory), a RAM (Random Access Memory), an I/O port, a common bus, and its peripheral circuit.

Figure 2:
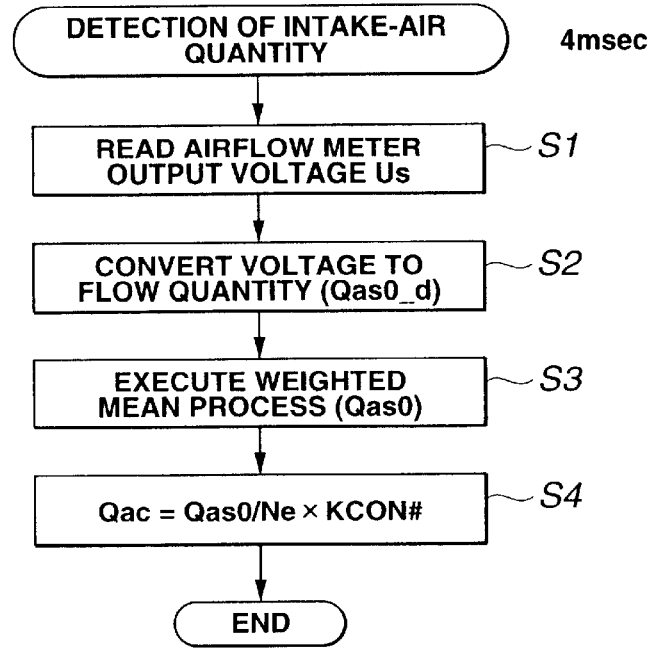
FIG. 2 is an operational flowchart representing an intake-air quantity detection routine in the air-fuel ratio control apparatus according to the present invention.

The air-fuel ratio feedback control according to the EGR control state, in the first embodiment of the air-fuel control apparatus according to the present invention, will be described below with reference to FIGS. 2 through 20. FIG. 2 shows an operational flowchart to detect the intake-air quantity. The flow shown in FIG. 2 is executed as 4-millisecond background job.

Figure 3:
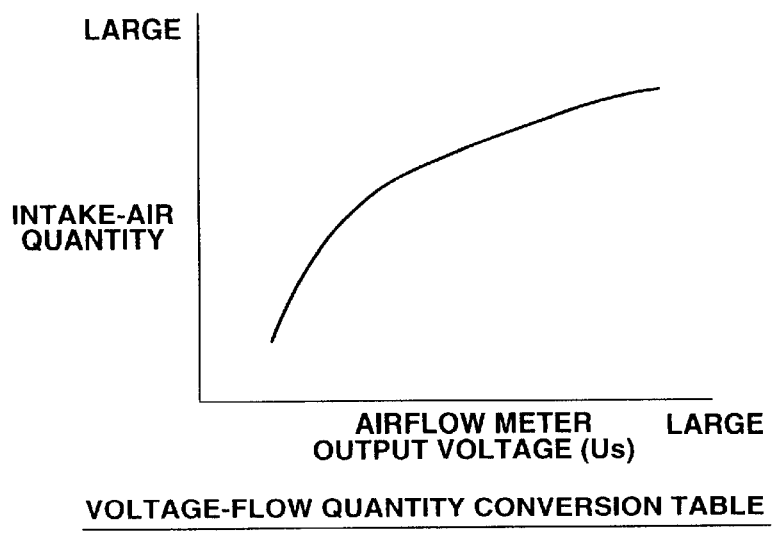
FIG. 3 is a map view representing a conversion table on an airflow meter output voltage to an intake-air quantity Qas0_d.

At a step S1, controller 20 reads an output voltage Us of airflow meter 14. At a step S2, controller 20 converts output voltage Us of airflow meter 14 into intake-air quantity Qas0_d using a linearization table as shown in FIG. 3. It is noted that a flow quantity described in FIGS. 2 and 3 corresponds to the above-described intake-air quantity.

At a step S3, controller 50 performs a weighted mean process to derive Qas0. At a step S4, controller 20 calculates an intake-air quantity per suction stroke Qac in accordance with the following equation and the routine shown in FIG. 2 is ended. Qac=Qas0/Ne×KCON#, wherein Ne denotes engine speed and KCON# denotes a predetermined conversion coefficient.

Figure 4:
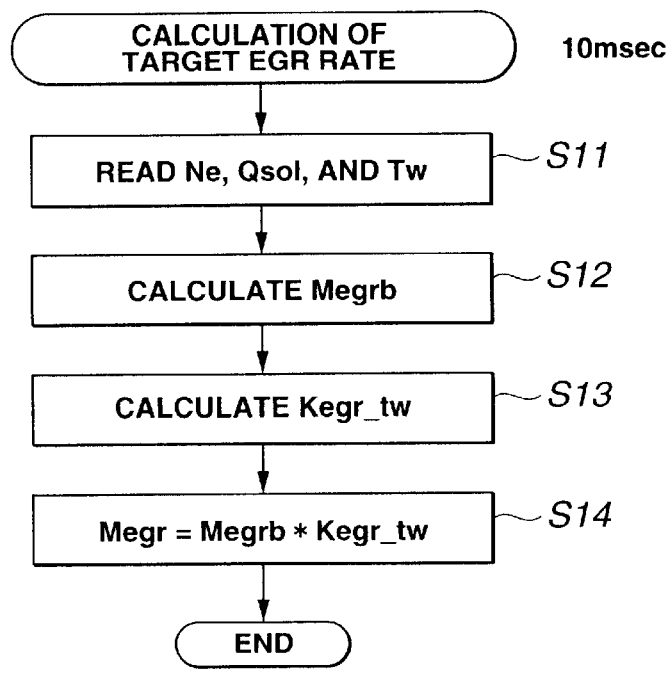
FIG. 4 is an operational flowchart representing a target EGR rate calculation routine in the air-fuel ratio control apparatus.
Figure 5:
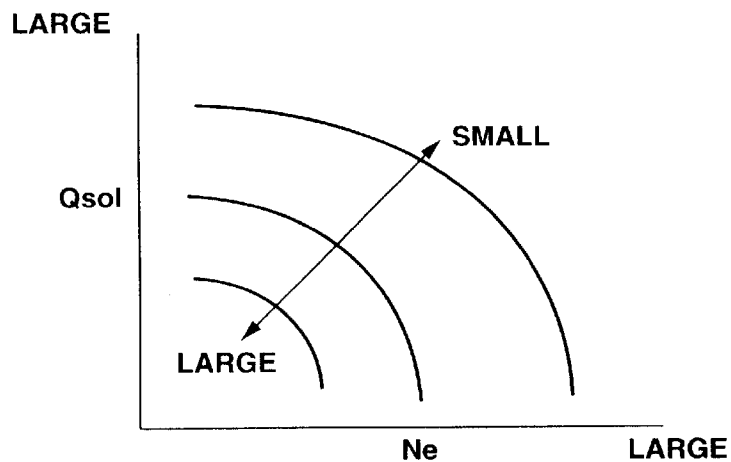
FIG. 5 is a map view representing an example of a basic target EGR rate.
Figure 6:
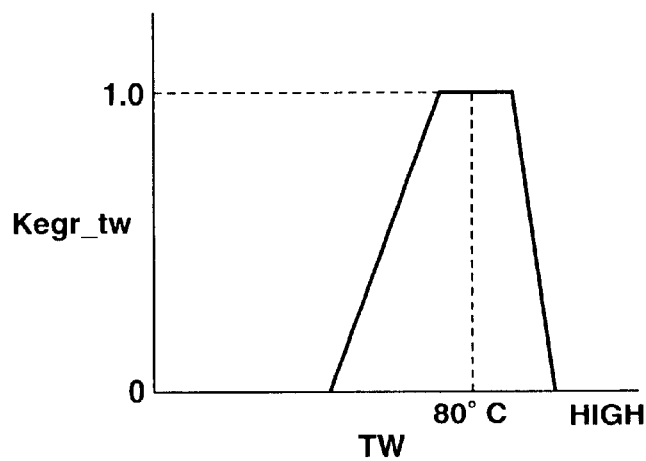
FIG. 6 is a map view representing an example of a table on a coolant temperature dependent correction coefficient on a target EGR rate.

Next, an operational flow of a calculation of a target EGR rate Megr will be described below with reference to FIG. 4. The flow of FIG. 4 is executed as a 10-millisecond background job.

At a step S11, controller 20 reads engine speed Ne, a fuel injection quantity (an engine load) Qsol, and engine coolant temperature TW. At a step S12, controller 20 searches a basic target EGR rate Megrb from a map shown in FIG. 5 according to engine speed Ne and fuel injection quantity Qsol. At a step S13, controller 20 searches a correction coefficient Kegr_tw of a target EGR rate from a map shown in FIG. 6 using engine coolant temperature TW. At a step S14, controller 20 calculates a target EGR rate Megr by multiplying a basic target EGR rate Megrb by a target EGR rate correction coefficient Kegr_tw and ends the present routine shown in FIG. 4.

Figure 7:
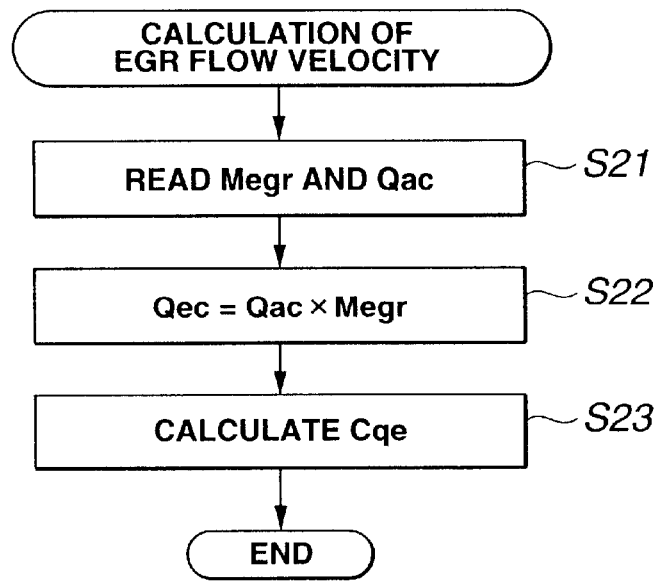
FIG. 7 is an operational flowchart representing a routine for a calculation of an EGR flow velocity Cqe.
Figure 8:
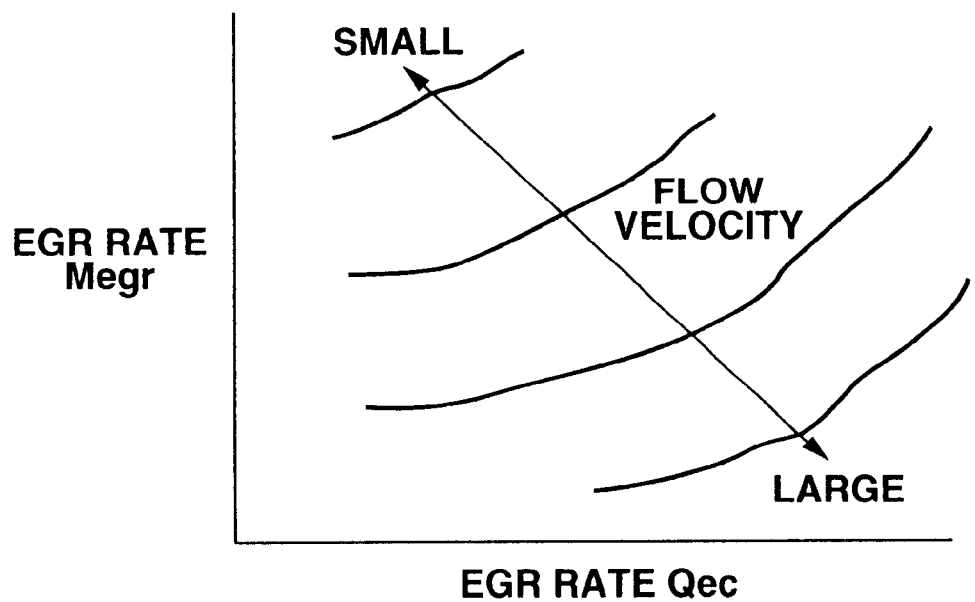
FIG. 8 is a map view representing an example of a table on EGR flow velocity Cqe.

FIG. 7 shows an operational flowchart of a calculation of an EGR flow velocity Qqe. It is noted that this flow shown in FIG. 7 serves to predict the EGR flow velocity, viz., a differential pressure before and after EGR valve 11 and a sensor may actually be disposed in EGR passage 12 to detect the EGR flow rate Cqe in place of the flowchart of FIG. 7.

At a step S21, controller 20 reads target EGR rate Megr and actual intake-air quantity Qac. At a step S22, controller 20 calculates an EGR flow quantity Qec in accordance with the following equation: Qec=Qac×Megr. At a step S23, controller 20 calculates an interpolation, for example, from a map shown in FIG. 8 to derive EGR flow velocity Cqe according to EGR flow quantity Qec and target EGR rate Megr and the routine shown in FIG. 7 is ended.

Figure 9:
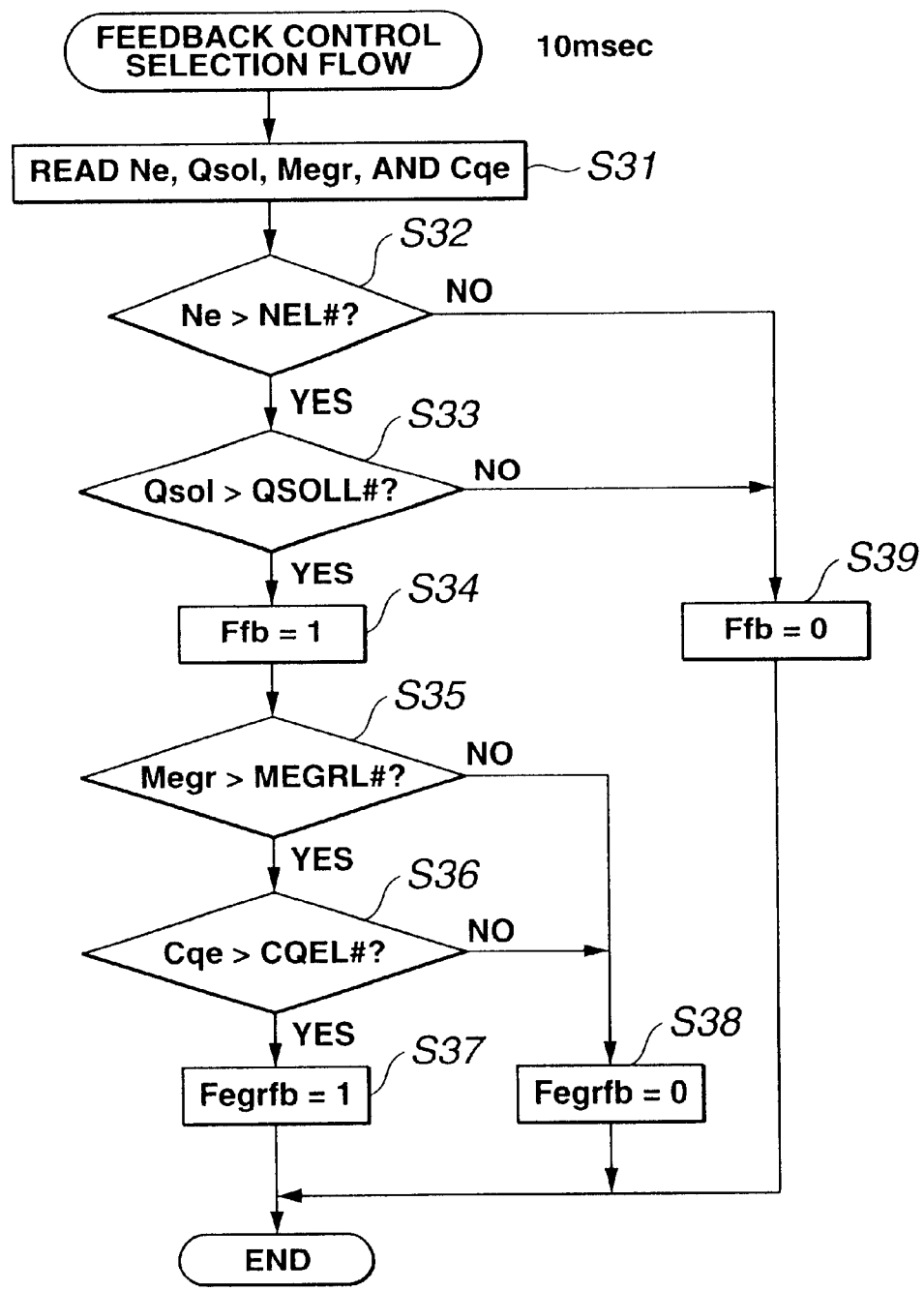
FIG. 9 is an operational flowchart representing a routine to select one of air-fuel ratio feedback control methods in the air-fuel ratio control apparatus.

FIG. 9 is a processing flowchart representing a selection of an air-fuel ratio feedback control between the air-fuel ratio feedback control through the EGR control and that through the intake-air quantity control and is applicable to each of first and second embodiments of the air-fuel ratio control apparatus according to the present invention. That is to say, at a step S31, controller 20 reads engine speed Ne, fuel injection quantity Qsol, target EGR rate Megr, and EGR flow velocity Cqe.

At a step S32, controller 20 determines whether engine speed value Ne is larger than a predetermined value NEL#. If Ne>NEL# (Yes) at step S32, the routine goes to a step S33. If Ne≦NEL# (No), the routine goes to a step S39. At step S33, controller 20 determines if fuel injection quantity Qsol is equal to or larger than a predetermined value QSOLL#. If Qsol>QSOLL# (Yes) at step S33, the routine goes to a step S34. If Qsol<QSOLL# (No) at step S33, the routine goes to step S39. At step S34, a feedback control enable flag Ffb is set to "1" (allowed).

At the next step S35, controller 20 determines if target EGR rate Megr is larger than a predetermined value MEGRL#. If Megr>MEGRL# (Yes) at step S35, the routine goes to a step S36. If Megr≦MEGRL# (No) at step S35, the routine goes to a step S38. If Cqe>CQEL# (Yes) at step S36, the routine goes to a step S37. If Cqe≦CQEL# (No) at step S36, the routine goes to a step S38. At step S37, controller 20 sets an EGR feedback execution flag Fegrfb to "1". Then, the routine shown in FIG. 9 is ended. At step S38, controller 20 sets the EGR feedback execution flag Fegrfb to "0" (inhibited or disabled). Then, the routine shown in FIG. 9 is ended.

Although, in this embodiment, the air-fuel ratio is feedback controlled through the EGR control when the EGR flow velocity is larger than the predetermined value at step S36, the feedback control through the EGR control may be executed when the EGR flow velocity Cqe is equal to or smaller than the predetermined value.

Figure 10:
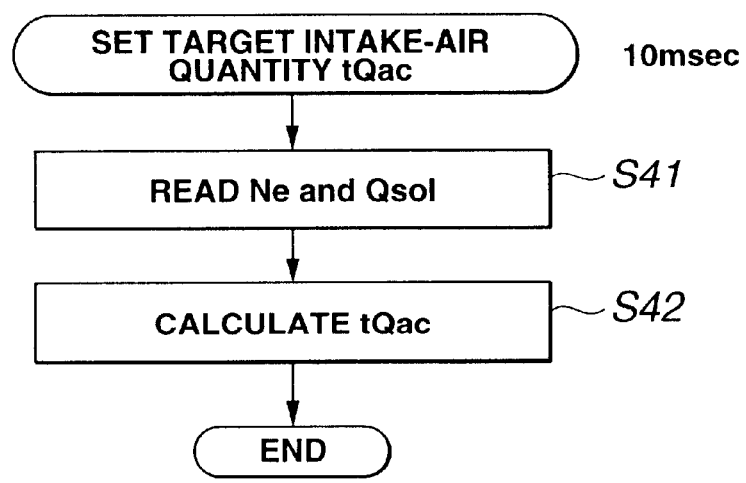
FIG. 10 is an operational flowchart representing a target intake-air quantity calculation routine.

FIG. 10 shows an operational flowchart for setting a target intake-air quantity tQac. The flowchart shown in FIG. 10 is a case where no rich spike control is executed. At a step S41, controller 20 reads engine speed Ne and fuel injection quantity Qsol. At a step S42, controller 20 calculates target intake-air quantity tQac from a map, for example, shown in FIG. 11 and ends the present routine.

Figure 12:
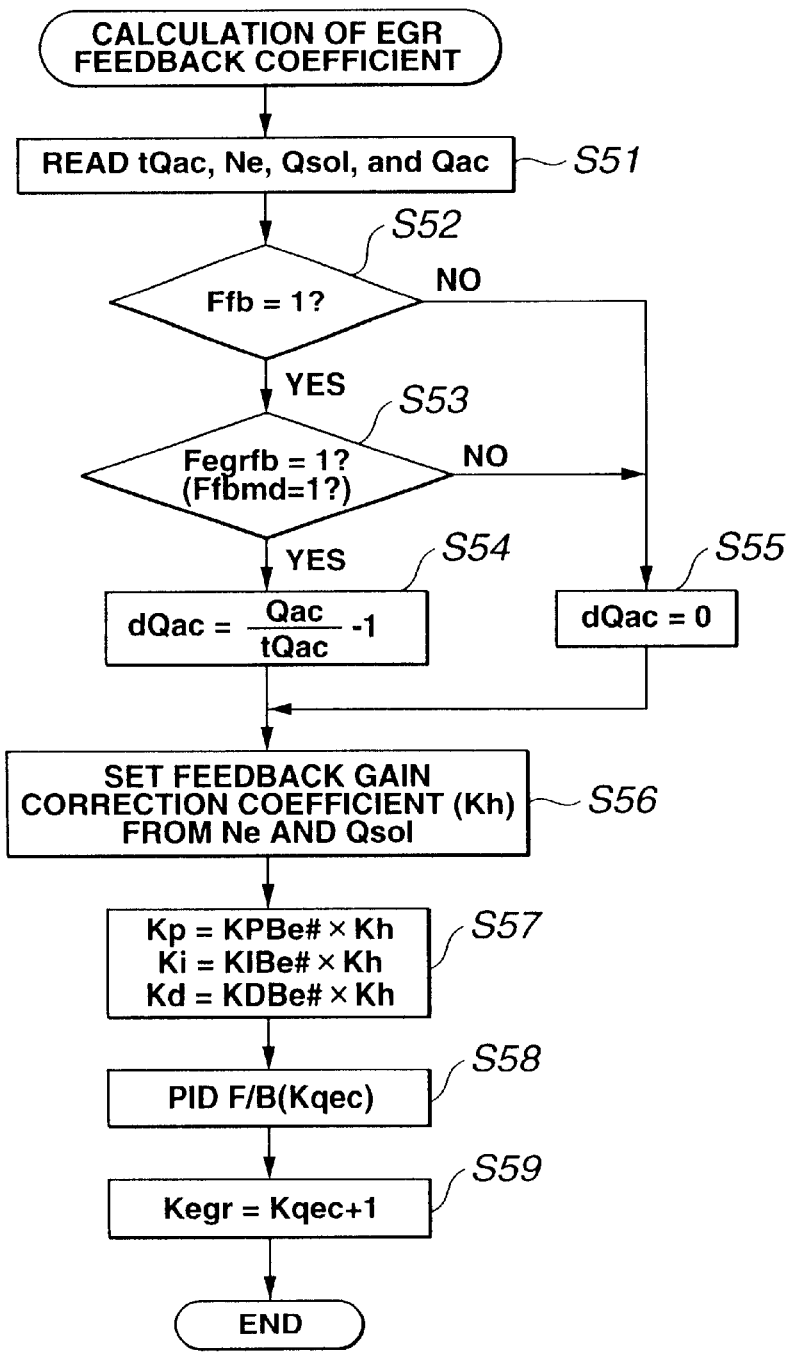
FIG. 12 is an operational flowchart representing a routine of a calculation of an EGR flow quantity correction coefficient Kegr.

FIG. 12 shows an operational flow representing a feedback coefficient Kegr of the EGR control. At a step S51, controller 20 reads target intake-air quantity tQac, engine speed Ne, fuel injection quantity Qsol, and actual intake-air quantity Qac.

At a step S52, controller 20 determines if the feedback is enabled (allowed) according to a state of feedback enable flag Ffb. If enabled (Ffb=1), the routine goes to a step S53. If disabled (Ffb=0), the routine goes to a step S55. At step S53, controller 20 determines if an EGR feedback control execution flag Fegrfb is set to "1" (enabled or allowed) or determines if a feedback mode flag Ffbmd is set to "1" (EGR feedback control mode). If an EGR feedback command is issued at step S53 (Fegrfb=1 (or Ffbmd=1)) (Yes), the routine goes to a step S54. If No at step S53, the routine goes to step S55. At step S54, controller 20 calculates an intake-air quantity error rate dQac from the following equation: dQac=Qac/tQac−1. At step S55, controller 20 sets error rate dQac to 0 since the present time is in the EGR feedback inhibit state. At step S56, controller 20 calculates a feedback gain correction coefficient Kh from engine speed Ne and fuel injection quantity Qsol and sets final (proportional, integration, and differential) correction gains (Kp, Ki, and Kd) at a step S57.

Figure 13:
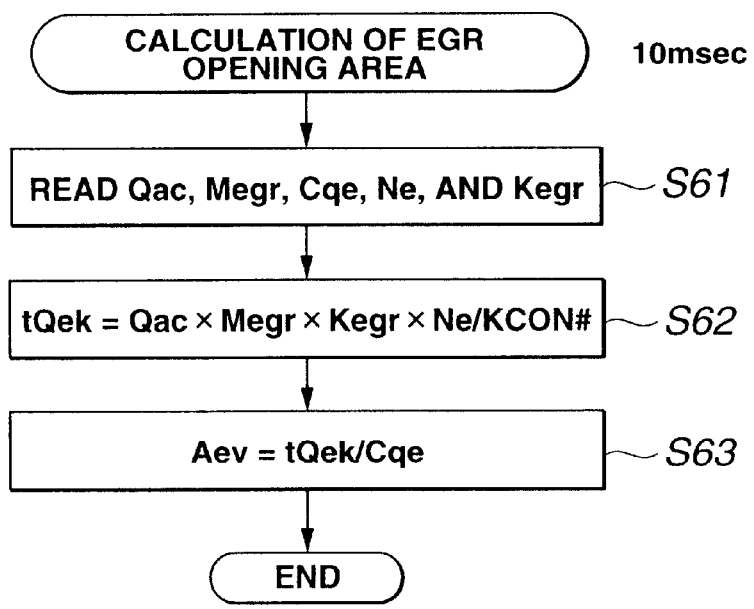
FIG. 13 is an operational flowchart of a routine of a calculation of an opening area Aev of an EGR (control) valve.

At a step S58, controller 57 calculates a feedback correction rate Kqec using feedback gain and dQac set at step S57. At a step S59, controller 20 calculates EGR flow quantity correction coefficient Kegr according to the following equation and the present routine shown in FIG. 12 is ended. Kegr=Kqec+1. Next, FIG. 13 shows an flowchart for calculating an opening area of EGR valve 11.

At a step S61, controller 20 reads actual intake-air quantity Qac, target EGR rate Megr, EGR flow velocity Cqe, engine speed Ne, EGR flow quantity correction coefficient Kegr. At a step S62, controller 20 calculates a target EGR flow quantity tQek from the following equation. This step serves to convert the flow quantity per unit time from the calculation of the EGR flow quantity and the EGR rate per suction stroke. That is to say, tQek=Qac×Megr×Kegr×Ne/KCON#.

At a step S63, controller 20 calculates EGR valve opening area Aev using the following equation from target EGR rate tQek and EGR flow velocity Cqe: Aev=tQek/Cqe.

Figure 14:
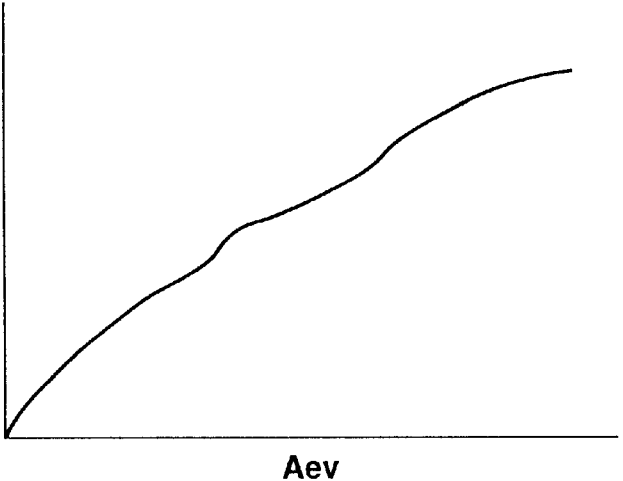
FIG. 14 is a map view representing an example of a conversion table on EGR valve opening area Aev to a drive signal to actuate an EGR valve actuator.

FIG. 14 shows an example of a table to convert an opening area Aev of EGR valve 11 into a command signal of the actuator. The command signal is outputted to EGR valve 11 to be controlled to make the opening area of EGR valve 11 equal to the above-described opening area Ave.

Figure 15:
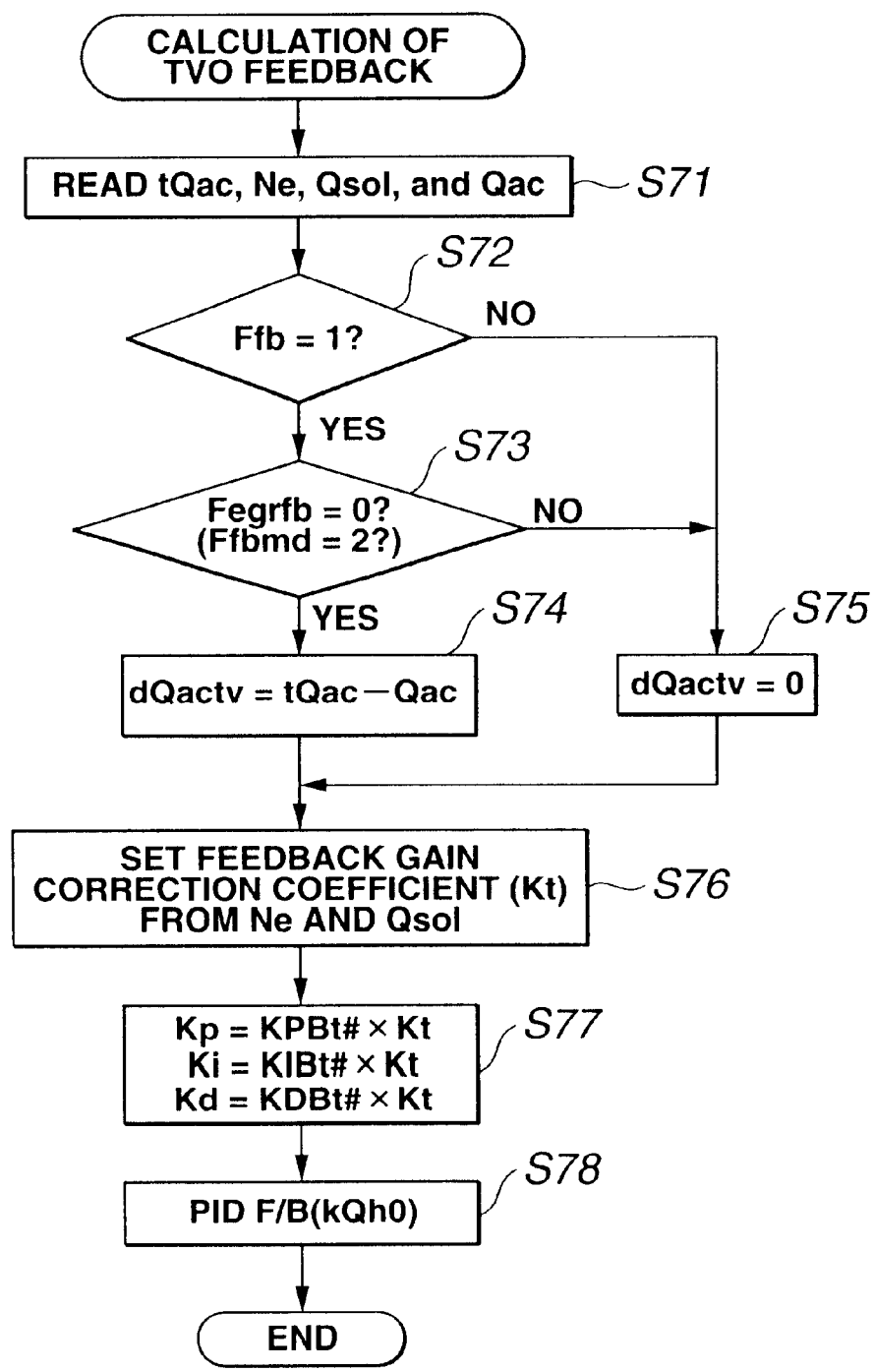
FIG. 15 is an operational flowchart representing a routine of a calculation of an intake throttle valve feedback quantity kQh0.

FIG. 15 shows an operational flowchart representing a calculation routine of a feedback quantity correction quantity kQh0 of intake throttle valve 13.

At a step S71, controller 20 reads target intake-air quantity tQac, engine speed Ne, fuel injection quantity Qsol, and actual intake-air quantity Qac. At a step S72, controller 20 determines whether the feedback control of the air-fuel ratio is enabled according to the state of feedback control enable flag Ffb. If Ffb=1 (Yes) at step S72, the routine goes to a step S73. If Ffb=0 (No) at step S72, the routine goes to a step S75. At step S73, controller 20 determines whether EGR feedback control execution flag Fegrfb is set to "0" or not or whether feedback control mode flag Ffbmd is 2. If Fegrbfb=0 or Ffbmd=2 (Yes) at step S73, the routine goes to a step S74. At step S74, controller 20 calculates an intake-air quantity error quantity dQactv from the following equation: dQactv=tQac−Qac. At step S75, intake-air quantity error quantity is zeroed (dQactv=0) since the feedback control of the air-fuel ratio through the intake-air quantity control is inhibited.

At a step S76, controller 20 sets a feedback gain correction coefficient Kt from engine speed Ne and fuel injection quantity Qsol and sets final correction gains at step S77 (Kp=KPBt#×Kt, Ki=KIBt#×Kt, Kd=KDBt#×Kt). At a step S78, controller 20 calculates a feedback correction quantity kQh0 using the feedback gains set at step S77 and dQactv and the present routine shown in FIG. 15 is ended.

Figure 16:
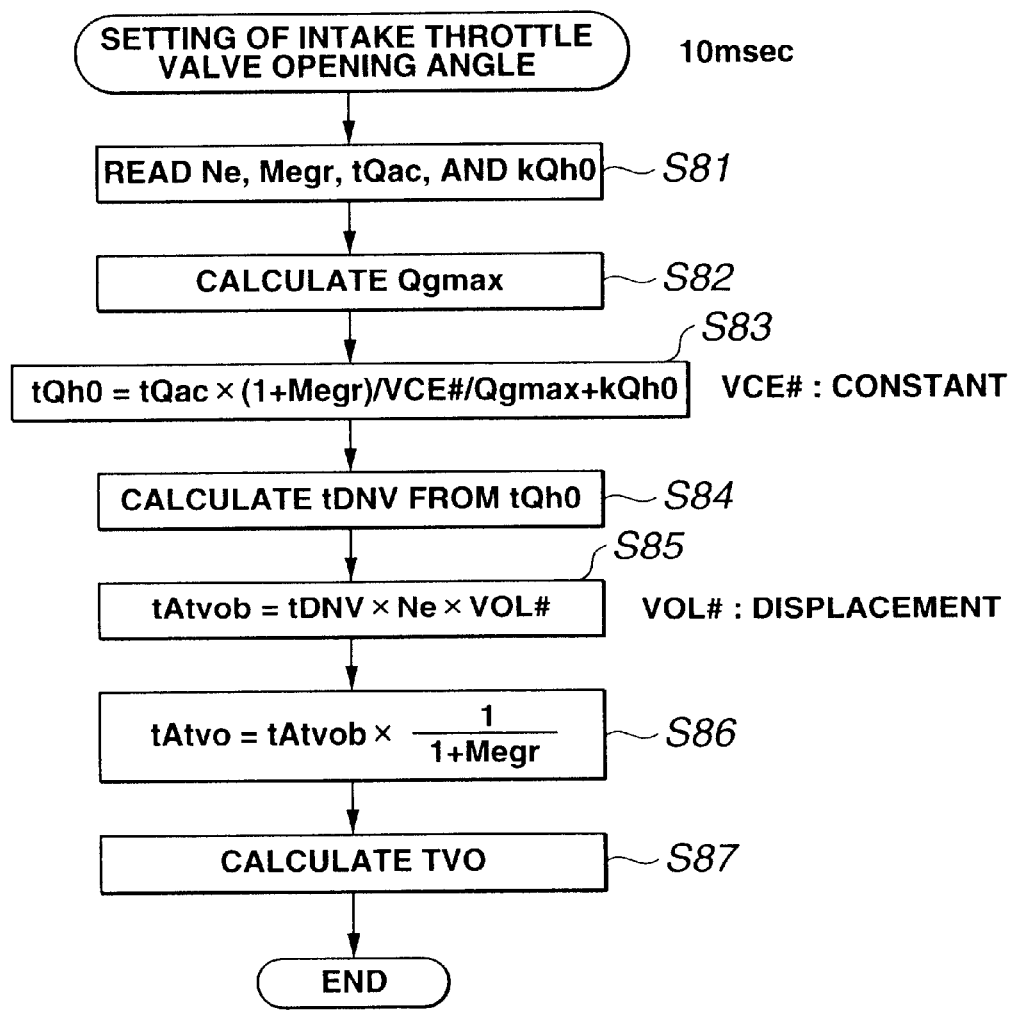
FIG. 16 is an operational flowchart representing a routine of a control of an opening degree TVO of an intake-air throttle valve.

FIG. 16 shows an operational flowchart representing a calculation of opening degree (or opening angle) TVO of intake throttle valve 11.

At a step S81, controller 20 reads engine speed Ne, target EGR rate Megr, target intake-air quantity tQac, and a feedback correction coefficient kQh0.

Figure 17:
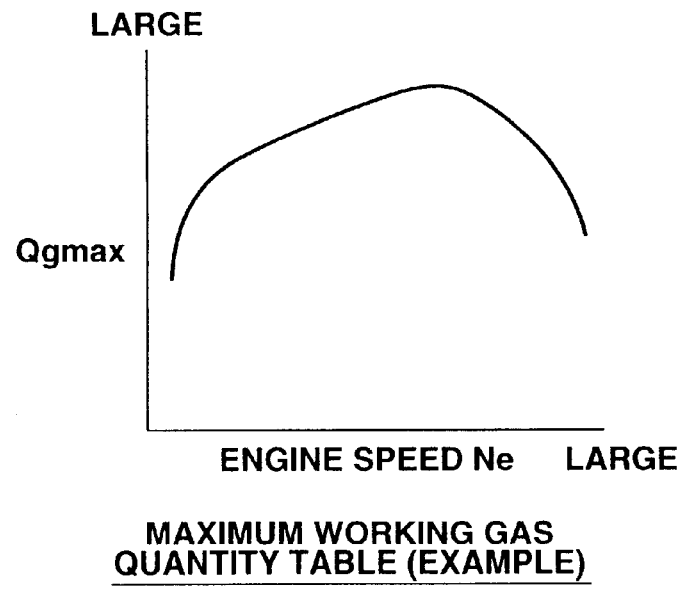
FIG. 17 is a map view representing an example of a conversion table on a maximum working gas quantity Qgmax.
Figure 18:
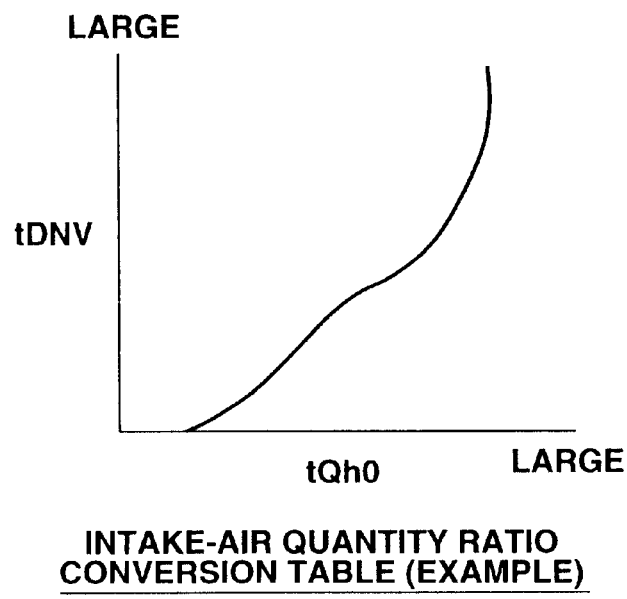
FIG. 18 is a map view representing an example of a conversion table on an intake-air quantity ratio tDNV.

At a step S82, controller 20 sets a maximum working gas quantity Qgmax by calculating an interpolation on a maximum working gas quantity table, for example, shown in FIG. 17 according to engine speed Ne.

At a step S83, controller 20 calculates a target working gas rate tQh0 from the following equation. tQh0=tQac×(1+Megr)/VCE#/Qgmax+kQh0. At a step S84, controller 20 calculates the interpolation on a table, for example, shown in FIG. 18, according to the calculated target working gas rate tQh0 to derive an intake-air quantity ratio tDNV.

At a step S85, controller 20 calculates a target opening area basic value tAtvob from the following equation: tAtvob=tDNV×Ne×VOL#. At a step S86, controller 20 calculates a target opening area tAtvo from the following equation. This is because a correction of the EGR gas corresponding area is made for the opening area tAtvob over the whole working gas. tAtvo=tAtvob/(1+Megr).

Figure 19:
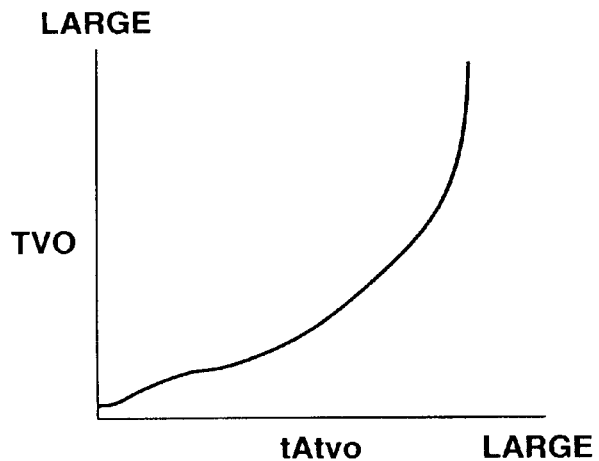
FIG. 19 is a map view representing an example of a conversion table on an opening degree of the intake throttle valve.

At a step S87, controller 20 carries out a unit conversion (area→angle) through a table, for example, shown in FIG. 19 and the routine is ended. Thus, the command signal is outputted to the actuator of intake throttle valve 13 so that the opening degree of throttle valve 13 is controlled to become TVO.

As described above, in the first preferred embodiment, when target EGR rate Megr is larger than predetermined value MEGRL# and EGR flow velocity Cque is larger (faster) than predetermined value CQEL#, air-fuel ratio feedback control through the EGR control is executed. In details, in a small region in which the EGR rate is equal to or below a predetermined rate, a change rate of the EGR controlled variable to the EGR rate becomes relatively large so that an appropriate EGR control cannot be achieved. Hence, in the small EGR rate region, the air-fuel ratio feedback control is carried out through intake-air quantity control so that highly accurate EGR control and air-fuel ratio control can be secured.

In addition, since, in a region in which the EGR rate is larger than the predetermined value, the change rate of the EGR controlled variable to execute air-fuel ratio feedback control becomes relatively small to the EGR rate, the air-fuel ratio feedback control is carried out through the EGR control. Thus, the control accuracy of EGR is secured while the air-fuel ratio control with favorable response and convergence characteristics is carried out.

Figure 20:
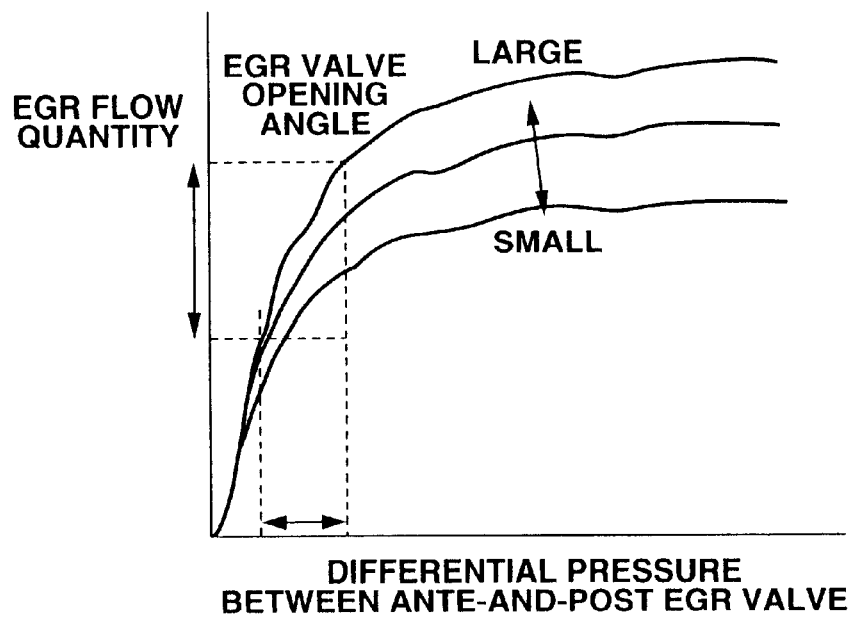
FIG. 20 is a map view representing an EGR valve ante-to-post differential pressure-to-EGR flow quantity characteristic.

For the EGR flow velocity, when a differential pressure before and after EGR valve 11 (differential pressure between ante-and-post EGR valve) which is a state variable corresponding to the EGR flow velocity, as shown in FIG. 20, is at a low differential pressure side, an EGR flow quantity sensitivity to the differential pressure is large. When the differential pressure before and after EGR valve 11 is at a high differential pressure side, the EGR flow quantity sensitivity to the opening degree (angle) of EGR valve 11 is large. Hence, in the first embodiment, at the low differential pressure side in which the EGR flow velocity is small, the differential pressure, in other words, the air-fuel ratio feedback control is carried out through opening degree control of throttle valve 13. At the high differential pressure side, the air-fuel ratio feedback control through the control of the opening degree of EGR valve 11 is carried out. Since a linearity of the control is easily maintained, the feedback gains can easily be set. However, it is possible to prevent a hunting caused by the feedback control when the air-fuel ratio feedback control through the control over the opening angle of EGR valve 11 is carried out at the low differential pressure side while the air-fuel ratio feedback control through the differential pressure, viz., the opening degree control of throttle valve 13 is carried out at the high differential pressure side.

As described above, although which control for the air-fuel ratio feedback control is carried out is different according to a demand, such a demand as to modify the air-fuel ratio feedback control with the differential pressure before and after EGR valve 11 is at least present. Hence, which control of the air-fuel ratio feedback controls through the EGR control and the intake-air quantity control may be selected according to the demand.

It is noted that although, in the first embodiment, the air-fuel ratio feedback control through the intake-air quantity control is carried out by controlling the opening degree of throttle valve 13, the air-fuel ratio feedback control through a turbo charge pressure control with turbo charger 1 is carried out in the second embodiment according to the present invention.

Next, the second preferred embodiment in which the turbo charge pressure control is carried out for the air-fuel ratio feedback control through the intake-air quantity control will be described below.

Figure 21:
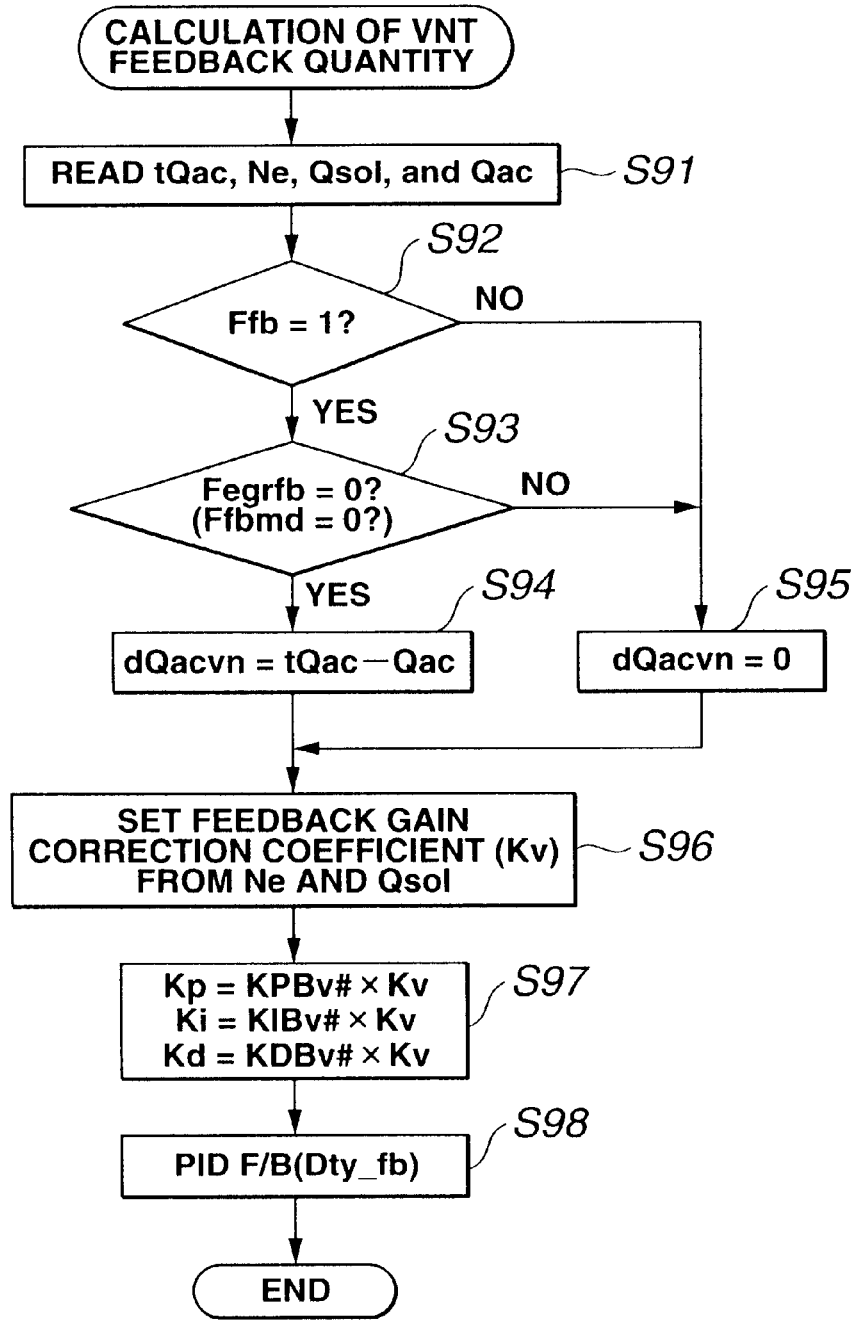
FIG. 21 is an operational flowchart of a routine on a calculation of a turbo charge pressure feedback quantity in a second preferred embodiment of the air-fuel ratio control apparatus according to the present invention.

FIG. 21 shows an operational flowchart representing a calculation routine of a feedback quantity Dty_fb of turbo charger 1.

At a step S91, controller 20 reads target intake-air quantity tQac, engine speed Ne, fuel injection quantity Qsol, and actual intake-air quantity Qac. At a step S92, controller 20 determines whether the feedback control is enabled (allowed) according to the state of the feedback enable flag Ffb. If enabled (Ffb=1) at step S92 (Yes), the routine goes to a step S93. If disabled (Ffb=0) at step S92 (No), the routine goes to a step S95.

At step S93, controller 20 determines whether EGR feedback control execution flag Fegrfb is reset to "0" or set to "1" (or whether feedback control mode flag Ffbmd is 0). If Fegrfb=1 (or Ffbmd≠0) (No) at step S93, the routine goes to step S95. If Fegrfb=0 (or Ffbmd=0) (No) at step S93, the routine goes to a step S94. At step S94, controller 20 calculates intake-air quantity error quantity dQacvn from the following equation: dQacvn=tQac−Qac. At step S95, controller 20 calculates error quantity dQacvn to zero (dQacvn= 0) since the feedback control is inhibited. At a step S96, controller 20 calculates feedback gain correction coefficient Kv of turbo charge pressure from engine speed Ne and fuel injection quantity Qsol. Controller 20 sets final correction gains (Kp=KPBv#×Kv, Ki=KIBv#×Kv, and Kd=KDBv#× Kv) at the next step S97. At the next step S98, controller 20 calculates a feedback correction quantity Dty_fb using feedback gain and dQacvn from engine speed Ne and fuel injection quantity Qsol. Then, the present routine of FIG. 21 is ended.

Figure 22:
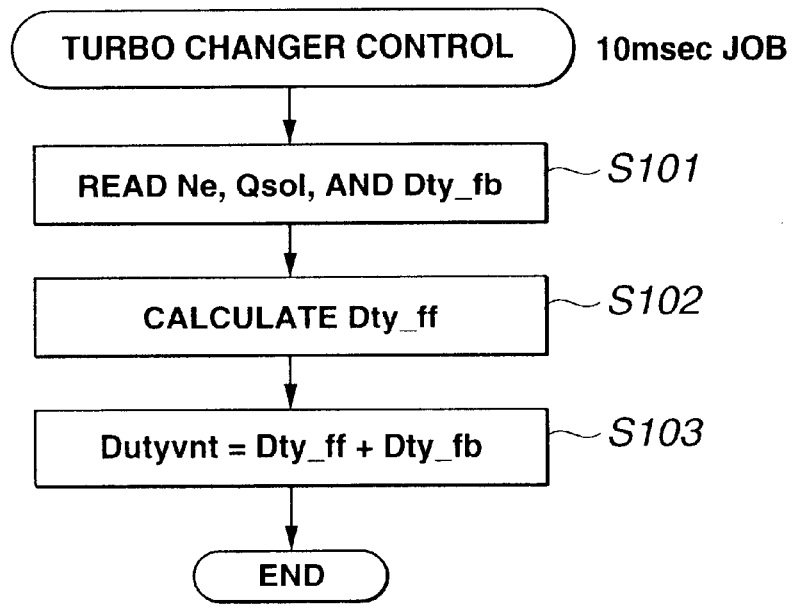
FIG. 22 is an operational flowchart representing a routine on a control of the turbo charge pressure of a turbo charger.

FIG. 22 shows an operational flowchart on the turbo charge pressure control (turbo charger pressure control).

Figure 23:
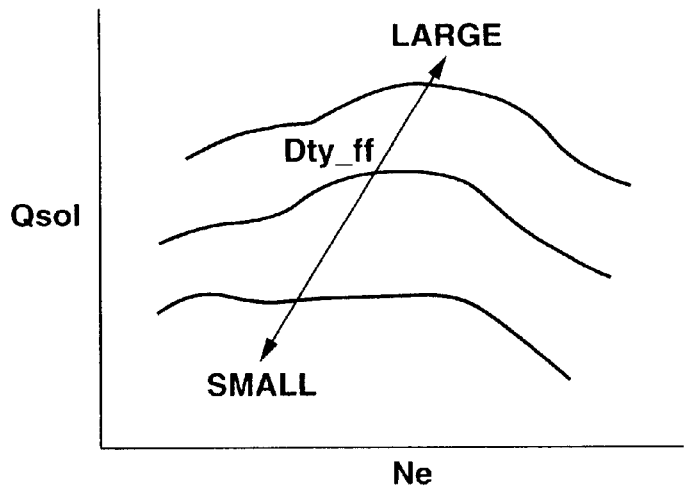
FIG. 23 is a characteristic graph representing a relationship among a target turbo charger control duty, an engine speed, and a fuel injection quantity.

At a step S101, controller 20 reads engine speed Ne, fuel injection quantity Qsol, and turbo charger feedback quantity Dty_fb. At a step S102, controller 20 calculates a feedforward quantity Dty_ff on a turbo charger command by an interpolation calculation of the map, for example, shown in FIG. 23. At a step S103, controller 20 calculates a final command value Dutyvnt from the following equation:

Dutyyvnt=Dty_ff+Dty_fb.

When the signal representing the final command value Dutyvnt is outputted to turbo charger 1 (exhaust turbine 1B), a control over variable nozzle of exhaust turbine 1B is executed so that the turbo charge pressure can be made substantially equal to a target turbo charge pressure.

Next, a third embodiment corresponding to a case where such a rich spike control to control the air-fuel ratio to be rich with respect to a stoichiometric air-fuel ratio in order to regenerate NOx trap catalyst 15 with NOx adsorbed onto NOx trap catalyst 15 reduced with HC in the exhaust gas will be described below.

Figure 24:
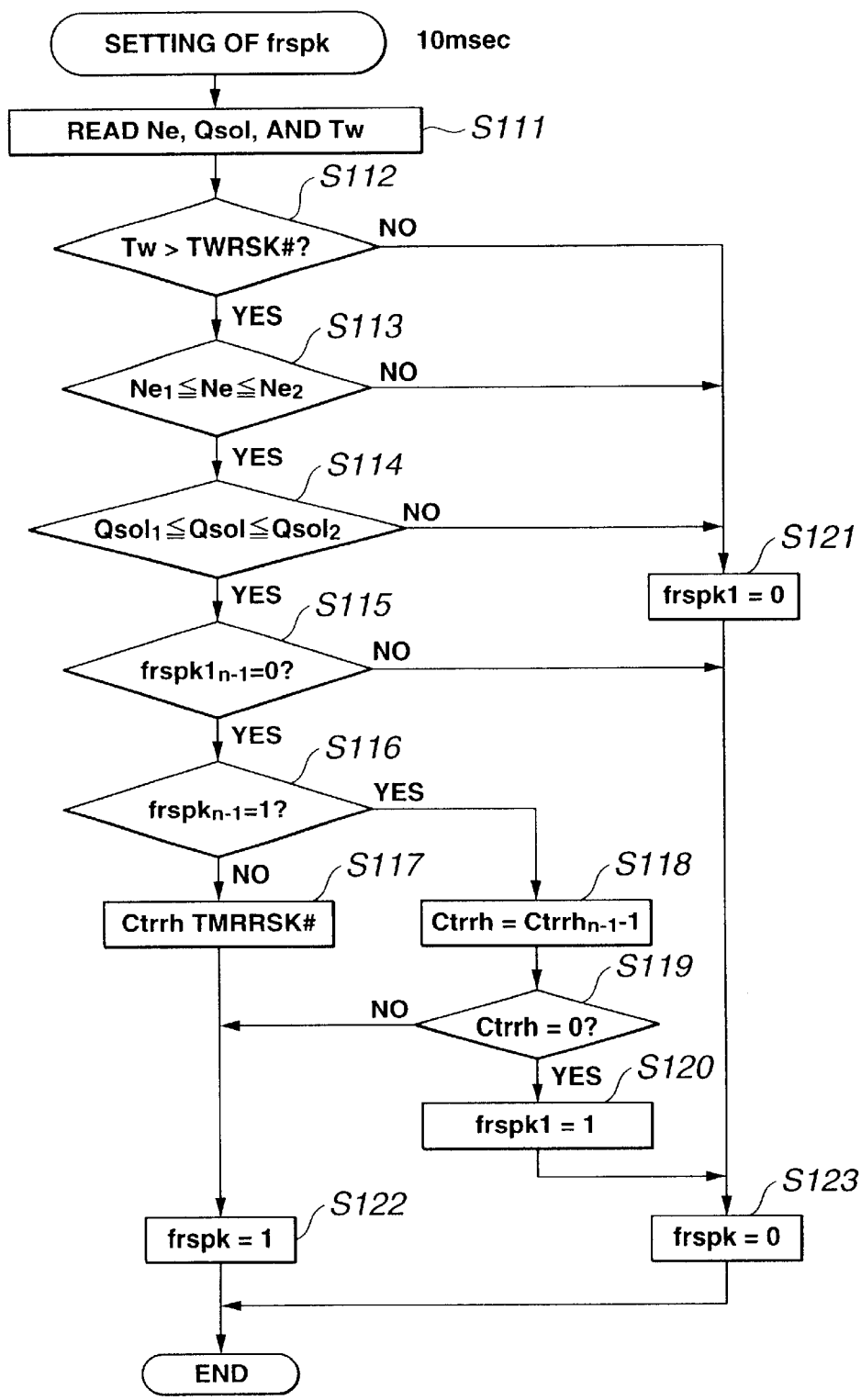
FIG. 24 is an operational flowchart representing a routine of a setting of rich spike control related flags.

FIG. 24 shows an operational flowchart representing a setting of a rich spike execution flag frspk.

At a step S111, controller 20 reads engine speed Ne, fuel injection quantity Qsol, and engine coolant temperature TW.

At a step S112, controller 20 determines whether coolant temperature TW is larger (higher) than a predetermined value TWRSK#. If (Yes) Tw>TWRSK# at step S112, the routine goes to a step S113. If NO (Tw≦TWRSK#) at step S112, the routine goes to a step S121.

At a step S113, controller 20 determines whether engine speed Ne falls within a predetermined range between a lower limit value $Ne_1$ and an upper limit value $Ne_2$. If engine speed Ne falls within the predetermined range between $Ne_1$ and $Ne_2$ (Yes), the routine goes to a step S114. If engine speed Ne does not fall within the predetermined range (No) at step S113, the routine goes to step S121.

At step S114, controller 20 determines whether fuel injection quantity Qsol (engine load) falls within a predetermined range between a lower limit value of $Qsol_1$ and an upper limit value of $Qsol_2$. If fuel injection quantity Qsol falls within the predetermined range between $Qsol_1$ and $Qsol_2$ (Yes) at step S114, the routine goes to a step S115. If fuel injection quantity does not fall within the predetermined range between $Qsol_1$ and $Qsol_2$ (No) at step S114, the routine goes to step S121. That is to say, at steps S113 and S114, controller 20 determines whether a present engine driving condition falls within a region in which the rich spike control can effectively be achieved, viz., in which HC (Hydro Carbon) which is a reduction agent of NOx (Nitrogen Oxides) is effectively developed by an introduction of the rich spike control.

At step S115, controller 20 determines whether a rich spike execution completion flag $frspkl_{n-1}$ is reset to "0". If $frspkl_{n-1}$=0 (Yes) at step S115, the routine goes to a step S116. If $frspkl_{n-1}$=1 (No) at step S115, the routine goes to a step S123.

At step S116, controller 20 determines whether a rich spike control execution condition at a previous routine shown in FIG. 24 is established so that the rich spike control has been under the execution, viz., rich spike control execution flag of the previous routine $frspk_{n-1}$ is set to "1". If $frspk_{n-1}$=1 (Yes) at step S116, the routine goes to a step S118. If $frspk_{n-1}$=0 (No) at step S116, the routine goes to a step S117. In addition, at step S118, controller 20 decrements counter Ctrrh by one (Ctrrh=$Ctrrh_{n-1}$−1). At the next step S119, controller 20 determines if a count value of counter Ctrrh is zeroed, viz., whether the rich spike control execution is ended or not. At step S117, controller 20 sets rich execution counter Ctrrh to TMRRSK#. At a step S122, rich spike control execution flag frspk is set to "1". If Ctrrh≠0 (No) at step S119, the routine goes to step S120, viz., not in the end condition, the routine goes to step S122 to set frspk to "1" (under the execution of the rich spike control). At step S102, controller 20 sets rich spike control execution completion flag frspkl to "1". In addition, if each determination of steps S112, S113, and S114 indicates No, the routine goes to step S121. At step S121, rich spike control completion flag frspkl is cleared. Then, the routine goes to step S123, rich spike control execution flag frspk is cleared and the present routine is ended. This process is executed for a predetermined time when a rich spike condition (driving condition) is established by the rich spike control is not yet executed. When a change of this driving condition is not found, the rich spike control is not executed. When the condition is again established after the driving condition is once out of the rich spike control condition, the rich spike control is again executed so as to prevent an unnecessary control from being executed.

Figure 25:
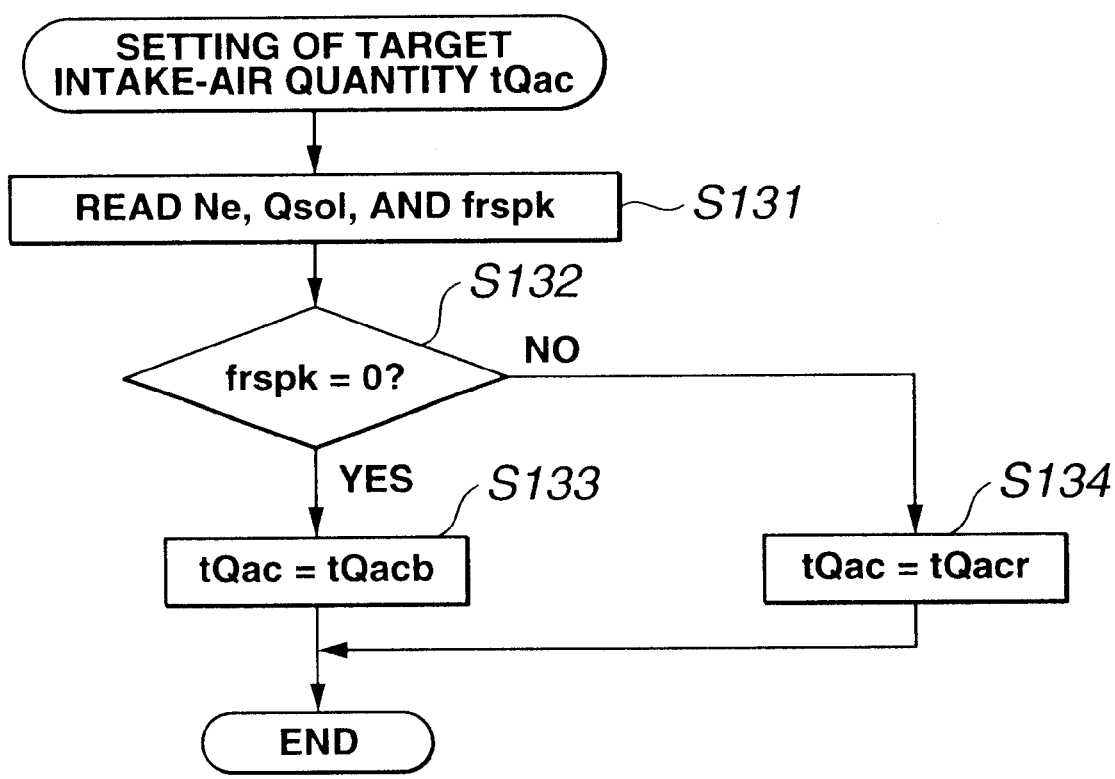
FIG. 25 is an operational flowchart representing a setting routine of a target intake-air quantity during an execution of the rich spike control.

FIG. 25 shows an operational flowchart representing a setting of target intake-air quantity tQac in the third preferred embodiment in which the rich spike control is carried out.

At step S131, controller 20 reads engine speed Ne, fuel injection quantity Qsol, and rich spike control execution flag frspk. At step S132, controller 20 determines whether flag frspk is cleared to "0". If frspk=0 (Yes) at step S132, the routine goes to a step S133. If frspk=1 (No) at step S132, the routine goes to a step S134.

Figure 11:
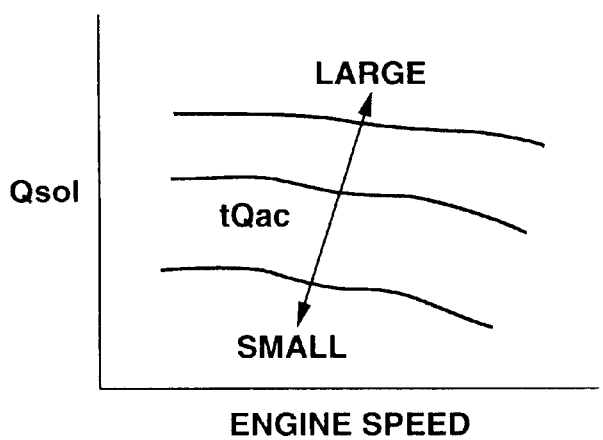
FIG. 11 is a map view representing an example of a table on a target intake-air quantity tQac.

At step S133, controller 20 sets target intake-air quantity tQac by calculating the interpolation on a map, for example, shown in FIG. 11 (tQacb) and the routine is ended. It is noted that the target intake-air quantity tQacr used for the rich spike control execution is set to a small value under the same drive condition (Ne and Qsol are the same) as compared with target intake-air quantity tQacb during the non-execution of the rich spike control. This causes the air-fuel ratio to be controlled to be rich.

Figure 26:
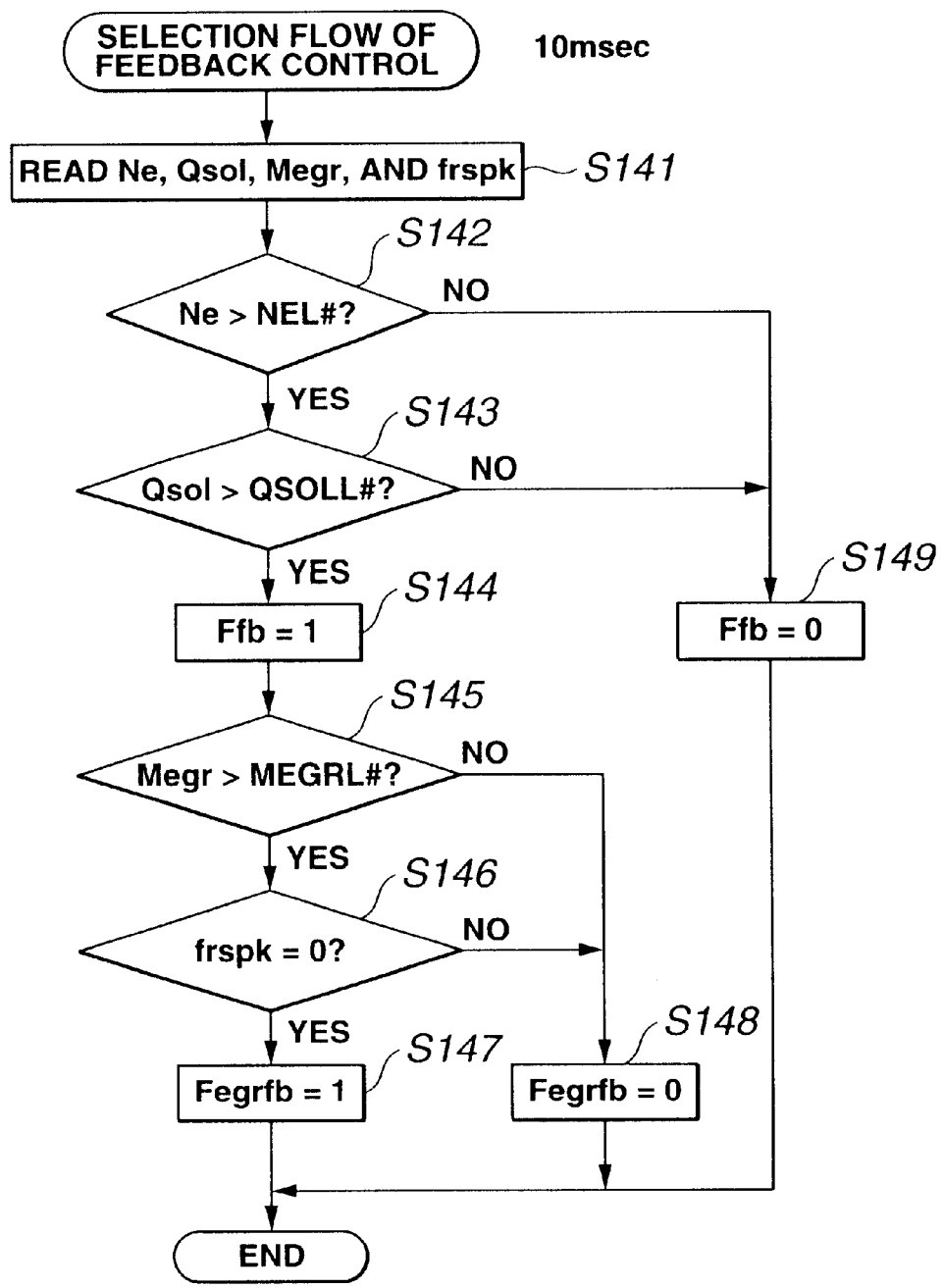
FIG. 26 is an operational flowchart representing a routine of the selection of one of the air-fuel ratio feedback control methods in a third preferred embodiment of the air-fuel ratio control apparatus according to the present invention.

FIG. 26 shows an operational flowchart representing the selection flow between the air-fuel ratio feedback control according to the EGR control and the air-fuel ratio feedback control according to the intake-air quantity control in the third embodiment of the air-fuel ratio control apparatus.

At a step S141, controller 20 reads engine speed Ne, fuel injection quantity Qsol, a target EGR rate Megr, and rich spike control execution flag frspk. At a step S142, controller 20 determines whether engine speed Ne is larger than a predetermined value NEL#. If Ne>NEL# (Yes) at step S142, the routine goes to a step S143. If Ne≦NEL# (No) at step S142, the routine goes to a step S149. If fuel injection quantity Qsol is larger than a predetermined value QSOLL# (Yes), the routine goes to a step S144. If Qsol≦QSOLL# (No) at step S143, the routine goes to step S149. At step S144, feedback control enable flag Ffb is set to "1" (allowed) and the routine goes to a step S145. At step S145, controller 20 determines if target EGR rate Megr is larger than a predetermined value MEGRL#. If Megr>MEGRL# (Yes), the routine goes to a step S146. If Megr≦MEGRL# (No), the routine goes to a step S148. At step S146, controller 20 determines if rich spike control execution flag frspk is reset to "0". If frspk=0 (Yes) at step S146, the routine goes to a step S147. If frspk=1 (No) at step S146, the routine goes to a step S148. At step S147, EGR feedback execution flag Fegrfb is set to "1" (allowed) At step S148, EGR feedback execution flag Fegrfb is reset to "0" (inhibited)

The EGR control is executed in accordance with FIGS. 12 and 13 in accordance with the set rich spike control execution flag frspk. If the intake-air quantity control through intake throttle valve 13 is used to perform the air-fuel ratio feedback control, this control is executed in accordance with FIGS. 15 and 16. If the turbo charge pressure control through turbo charger 1 is used to perform air-fuel ratio feedback control, this control is executed in accordance with FIGS. 21 and 22.

Figure 27:
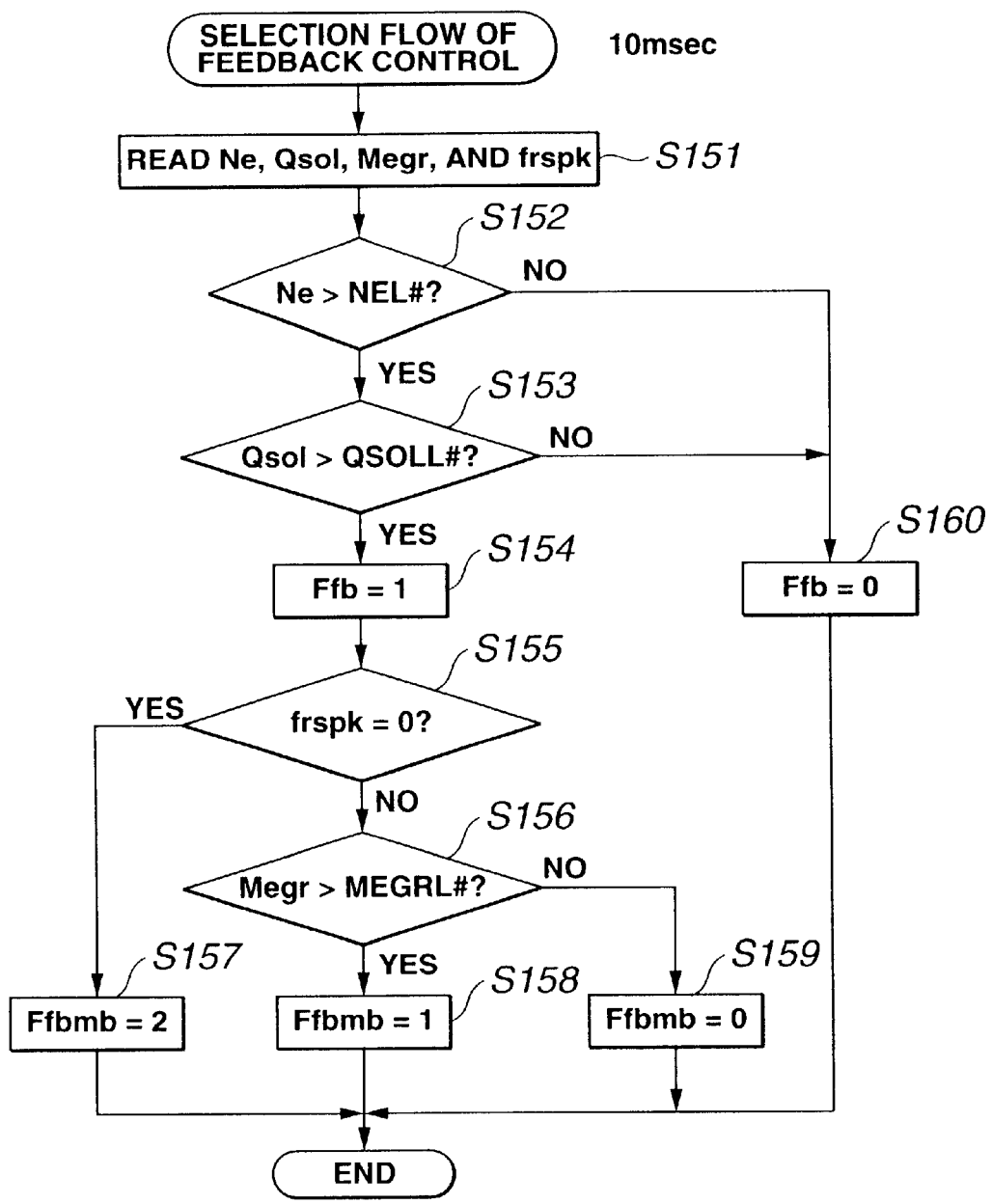
FIG. 27 is an operational flowchart representing a routine of the selection of one of the air-fuel feedback control methods in a fourth preferred embodiment of the air-fuel ratio control apparatus according to the present invention.

As described above, in the third embodiment, the air-fuel ratio feedback control through the control of intake-air quantity is carried out using either one of the intake throttle valve control or turbo charge pressure control. However, such intake-air quantity control and turbo charge pressure control as described above may be switched therebetween to perform the air-fuel ratio feedback control depending on a condition. FIG. 27 shows an operational flowchart representing a selection of control for the air-fuel ratio feedback control in the fourth embodiment of the air-fuel ratio control apparatus. In the fourth embodiment, the throttling control of intake throttle valve 13 is carried out to achieve the air-fuel ratio feedback control during the execution of the rich spike control and, during the non-execution of the rich spike control, the air-fuel ratio feedback control through the EGR control in accordance with target EGR rate and the air-fuel ratio feedback control through the turbo charge pressure control are switched therebetween during the non-execution of the rich spike control.

Steps S151 through S154 and a step S160 in FIG. 27 are the same as those contents of steps S141 through S144 and step S149 shown in FIG. 26. Therefore, the explanations of steps S151 through S154 and step S160 will be omitted herein.

After, at step S154, controller 20 enables feedback control enable flag Frb viz., sets Frb to "1".

At step S155, controller 20 determines if rich spike control execution flag frspk is reset to "0". If frspk=0 (viz., the EGR feedback control is not executed), the routine goes to a step S157.

At step S157, feedback mode flag Ffbmd is set to "2". This mode (Ffbmd=2) represents the feedback control mode through the intake throttle valve opening degree control.

If frspk=1 (No) at step S155, the routine goes to a step S156. If Megr>MEGRL# at step S156, controller 20 determines whether target EGR rate Megr is larger than predetermined value MEGRL#. If Megr>MEGRL# at step S156 (Yes), the routine goes to a step S158. At step S156, controller 20 sets feedback mode Ffbmd to "1". This mode (Ffbmd=1) represents the feedback execution mode in which the EGR control of EGR valve 11 is executed. If target EGR rate Megr is equal to or lower than predetermined value MEGL# (No) at step S159, controller 20 sets feedback mode Ffbmd to "0" representing that the control is the air-fuel ratio feedback control through the turbo pressure control using turbo charger 1.

In feedback mode flag Ffbmd is used to determine whether Ffbmd=1 in place of flag Fegrfb at step S53 in FIG. 12 (denoted by a bracket at step S53 of FIG. 12) in the case of the EGR control. In feedback mode Ffbmd is used to determine whether Ffbmd=2 in place of flag Fegrfb at step S73 of FIG. 15 (denoted by a bracket at step S73 of FIG. 15) in the case of the opening degree control of intake throttle valve 13. In the turbo charge pressure control, feedback mode Ffbmd is used to determine whether Ffbmd=0 in place of flag Fegrfb at step S93 in FIG. 27 (denoted by a bracket at step S93 in FIG. 27). Thus, the air-fuel ratio feedback control through the opening degree control of intake throttle valve 13 during the execution of the rich spike control, through the EGR control when target EGR rate is small during the non-execution of the rich spike control, and through the turbo charge pressure control when target EGR rate is large during the non-execution of the rich spike control according to the respective determinations described above.

Figures 28A, 28B, 28C:
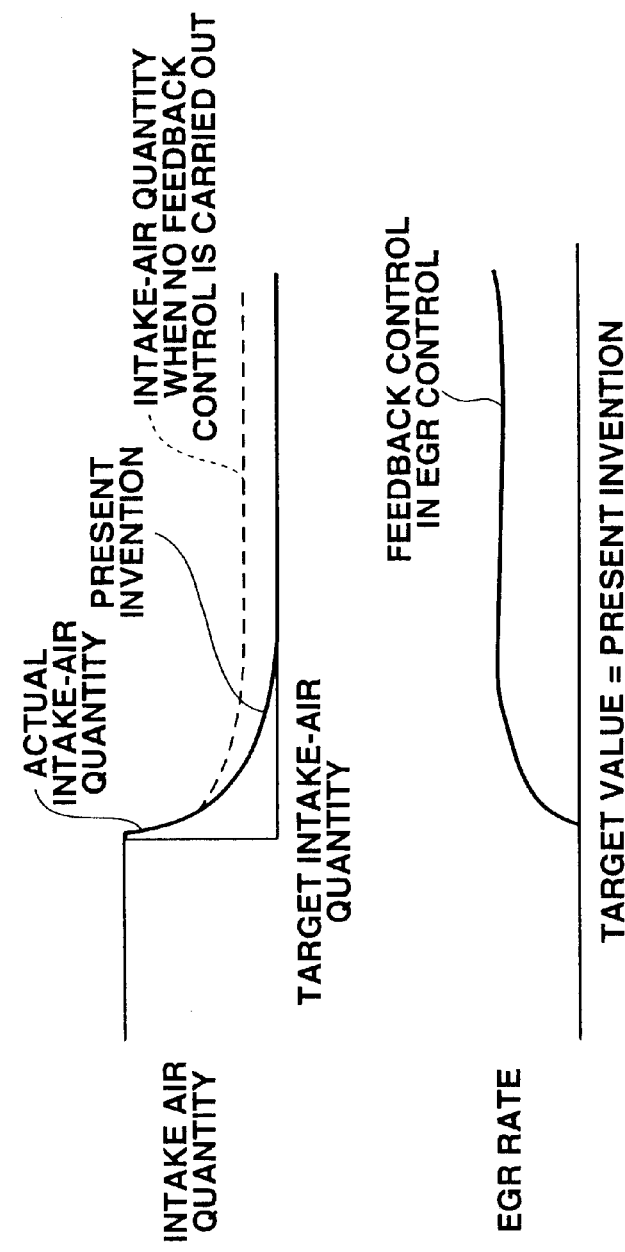
FIGS. 28A, 28B, and 28C are characteristic graphs for representing advantages achieved by each of the third and fourth embodiments.

In each of the third and fourth embodiments, since the air-fuel ratio feedback control through the intake-air quantity control is carried out forcefully (unconditionally) during the execution of the rich spike control, the air-fuel ratio and EGR rate can respectively and accurately be made substantially equal to target air-fuel ratio and target EGR rate, as shown in FIGS. 28A, 28B, and 28C. Thus, stable combustion and favorable exhaust gas purification can compatibly be achieved.

It is noted that, in the above-described first through fourth embodiments, the intake-air quantity is detected and the air-fuel ratio is feedback controlled so that the detected intake-air quantity is made substantially equal to the target air-fuel ratio. However, the air-fuel ratio feedback control such that the air-fuel ratio detected by an air-fuel ratio sensor is made substantially equal to target air-fuel ratio (stoichiometric air-fuel ratio) $\lambda$. In this case, with the target intake-air quantity set as a feed-forward quantity, the intake-air quantity may be controlled through the EGR control or may directly be controlled on the basis of an error quantity between target air-fuel ratio and actual air-fuel ratio.

The entire contents of a Japanese Patent Application No. 2001-90966 (filed in Japan on Mar. 27, 2001) are herein incorporated by reference. The scope of the invention is defined with reference to the following claims.

What is claimed is:

1. An air-fuel ratio control apparatus for an internal combustion engine having an EGR valve interposed in an EGR passage between an intake manifold and an exhaust manifold, comprising:
    a target EGR quantity calculating section that calculates a target EGR quantity;
    a control execution determining section that determines which of air-fuel ratio feedback controls through an EGR control and through an intake-air quantity is to be executed according to the target EGR quantity; and
    a control execution section that selectively executes one of the air-fuel ratio feedback controls according to a result of a determination by the control execution determining section.

2. An air-fuel ratio control apparatus for an internal combustion engine having an EGR valve interposed in an EGR passage between an intake manifold and an exhaust manifold as claimed in claim 1, further comprising a target intake-air quantity calculating section that calculates a target intake-air quantity on the basis of an engine driving condition and wherein the target EGR quantity calculating section calculates the target EGR quantity on the basis of the engine driving condition and the control execution section selects, under an execution condition of the air-fuel ratio feedback control, one of the air-fuel ratio feedback controls which is based on the EGR control such that an EGR controlled variable is adjusted to control indirectly the intake-air quantity and which is based on the intake-air quantity control such that the intake-air quantity is directly controlled, on the basis of the target EGR quantity.

3. An air-fuel ratio control apparatus for an internal combustion engine having an EGR valve interposed in an EGR passage between an intake manifold and an exhaust manifold as claimed in claim 1, further comprising a rich air-fuel ratio controlling section that executes a control for the air-fuel ratio to be rich and wherein, when the rich air-fuel ratio controlling section executes the control for the air-fuel ratio to be rich, the control execution section unconditionally selects the air-fuel ratio feedback control through the intake-air quantity control.

4. An air-fuel ratio control apparatus for an internal combustion engine having an EGR valve interposed in an EGR passage between an intake manifold and an exhaust manifold as claimed in claim 1, wherein the target EGR quantity is set to be a target EGR rate.

5. An air-fuel ratio control apparatus for an internal combustion engine having an EGR valve interposed in an EGR passage between an intake manifold and an exhaust manifold as claimed in claim 1, wherein the control execution section modifies the selection of one of the air-fuel ratio feedback controls on the basis of a flow velocity of an EGR gas or a state variable corresponding to the flow velocity of the EGR gas.

6. An air-fuel ratio control apparatus for an internal combustion engine having an EGR valve interposed in an EGR passage between an intake manifold and an exhaust manifold as claimed in claim 1, wherein the air-fuel ratio feedback control through the intake-air quantity control includes a control over an opening degree of an intake throttle valve interposed in an intake air system of the engine.

7. An air-fuel ratio control apparatus for an internal combustion engine having an EGR valve interposed in an EGR passage between an intake manifold and an exhaust manifold as claimed in claim 1, wherein the air-fuel ratio feedback control through the intake-air quantity includes a control over a turbo charge pressure of a turbo charger.

8. An air-fuel ratio control apparatus for an internal combustion engine having an EGR valve interposed in an EGR passage between an intake manifold and an exhaust manifold as claimed in claim 1, wherein the target EGR quantity calculating section comprises: an engine driving condition detecting section that detects an engine driving condition; and a target EGR rate calculating section that calculates a target EGR rate Megr on the basis of the detected engine driving condition and wherein the control execution section selects the air-fuel ratio feedback control through the EGR control when the target EGR rate Megr is larger than a first predetermined value MEGRL#.

9. An air-fuel ratio control apparatus for an internal combustion engine having an EGR valve interposed in an EGR passage between an intake manifold and an exhaust manifold as claimed in claim 8, wherein the target EGR quantity calculating section comprises: an actual intake-air quantity detecting section that detects an actual intake-air quantity Qac from an airflow meter disposed in an intake air system of the engine; an EGR flow quantity calculating section that calculates an EGR flow quantity Qec from the target EGR rate Megr and the detected actual intake-air quantity Qac; and an EGR flow quantity calculating section that calculates an EGR flow velocity Cqe from the target EGR rate Megr and the actual intake air-quantity Qac and wherein the control execution section selects the air-fuel ratio feedback control through the EGR control when the target EGR rate Megr is larger than the first predetermined value MEGRL# and the EGR flow velocity Cqe is larger than a second predetermined value CQEL#.

10. An air-fuel ratio control apparatus for an internal combustion engine having an EGR valve interposed in an EGR passage between an intake manifold and an exhaust manifold as claimed in claim 9, wherein the engine driving condition detecting section comprises an engine speed detecting section that detects an engine speed Ne and an engine load detecting section that detects an engine load Qsol and wherein the control execution determining section determines which of the air-fuel ratio feedback controls is to be executed when the engine speed Ne is larger than a third predetermined value NEL# and the engine load is larger than a fourth predetermined value QSOLL#.

11. An air-fuel ratio control apparatus for an internal combustion engine having an EGR valve interposed in an EGR passage between an intake manifold and an exhaust manifold as claimed in claim 10, wherein the control execution section comprises an EGR control execution section that executes the EGR control when the engine speed Ne is larger than the third predetermined value NEL#, the engine load Qsol is larger than the fourth predetermined value QSOLL#, the target EGR rate Megr is larger than the first predetermined value MEGRL#, and the EGR flow velocity Cqe is larger than the second predetermined value CQEL# and the EGR control execution section comprises: a target intake-air quantity calculating section that calculates a target intake-air quantity tQac according to the engine speed Ne and the engine load Qsol; an EGR feedback correction coefficient calculating section that calculates an intake-air quantity error rate dQac from the actual intake-air quantity Qac and the target intake-air quantity tQac, and calculates an EGR flow quantity correction coefficient Kegr from the engine speed Ne, the engine load Qsol, EGR feedback gains, and EGR feedback correction rate Kqec; an EGR valve opening area calculating section that calculates a target EGR flow quantity tQek from the actual intake-air quantity Qac, the target EGR rate Megr, the EGR flow quantity correction coefficient Kegr, and the engine speed Ne, calculates an opening area Aev of the EGR valve from the target EGR flow quantity tQek and the EGR flow velocity Cqe; and an EGR command signal converting section that coverts the opening area Aev into a EGR valve command signal to be supplied to an EGR valve actuator to actuate the EGR valve to control the opening area of the EGR valve to be equal to the opening area Aev.

12. An air-fuel ratio control apparatus for an internal combustion engine having an EGR valve interposed in an EGR passage between an intake manifold and an exhaust manifold as claimed in claim 11, wherein the control execution section comprises an intake-air quantity control execution section that executes a control over an opening degree of an intake throttle valve to execute the intake-air quantity control when the engine speed Ne is larger than the third predetermined value NEL#, the engine load Qsol is larger than the fourth predetermined value QSOLL#, the target EGR rate Megr is equal to or smaller than the first predetermined value MEGRL#, and the EGR flow velocity Cqe is equal to or smaller than the second predetermined value CQEL# and the intake throttle valve opening area control section comprises: a feedback correction quantity calculating section that calculates an intake-air quantity error quantity tQactv from the target intake-air quantity tQac and the actual intake-air quantity Qac and calculates a feedback correction quantity kQh0 from feedback gains calculated from the engine speed Ne and the engine load Qsol and the intake-air quantity error quantity tQactv; a target opening area calculating section that calculates a target opening area tAtvo of the intake throttle valve from a target opening area basic value tAtvob calculated from a target working gas rate tQh0, the engine speed Ne, and the target EGR rate Megr; and a throttle valve command signal converting section that converts the target opening area tAtvo into a throttle valve command signal TVO to be supplied to an intake throttle valve actuator to actuate the throttle valve so that the opening area of the throttle valve is made substantially equal to an opening degree TVO corresponding to the target opening area tAtvo.

13. An air-fuel ratio control apparatus for an internal combustion engine having an EGR valve interposed in an EGR passage between an intake manifold and an exhaust manifold as claimed in claim 11, wherein the control execution section comprises an intake-air quantity control execution section that executes a control over a turbo charge pressure of a turbo charger to execute the intake-air quantity control when the engine speed Ne is larger than the third predetermined value NEL#, the engine load Qsol is larger than the fourth predetermined value QSOLL#, the target EGR rate Megr is equal to or smaller than the first predetermined value MEGRL#, and the EGR flow velocity Cqe is equal to or smaller than the second predetermined value CQEL# and wherein the intake-air quantity control execution section comprises a turbo charge pressure control feedback quantity calculating section that calculates a feedback quantity Dty_fb of a turbo charger from feedback gains calculated from the engine speed Ne, the engine load Qsol, and an intake-air quantity error quantity dQacvn between the target intake-air quantity tQac and the actual intake-air quantity Qac; a final command value calculating section that calculates a final command value Dutyvnt to be supplied to the turbo charger from the feedback quantity of the turbo charger Dty_fb and a feed-forward quantity of the turbo charger Dty_ff; and a final command value output section that outputs the final command value Dutyvnt to a variable nozzle of the turbo charger so as to control the turbo charger to make the turbo charge pressure substantially equal to a target turbo charge pressure.

14. An air-fuel ratio control apparatus for an internal combustion engine having an EGR valve interposed in an EGR passage between an intake manifold and an exhaust manifold as claimed in claim 1, further comprising a rich spike control execution determining section that determines whether the engine is under an execution of a rich spike control and wherein the control execution section unconditionally selects the air-fuel ratio feedback control through the intake-air quantity control when the rich spike control execution determining section determines that the engine is under the execution of the rich spike control.

15. An air-fuel ratio control apparatus for an internal combustion engine having an EGR valve interposed in an EGR passage between an intake manifold and an exhaust manifold as claimed in claim 14, wherein the control execution section comprises an intake-air quantity control section that executes a control over an opening degree of an intake-air throttle valve when the rich spike control execution determining section determines that the engine is under the execution of the rich spike control.

16. An air-fuel ratio control apparatus for an internal combustion engine having an EGR valve interposed in an EGR passage between an intake manifold and an exhaust manifold as claimed in claim 14, wherein the control execution section comprises an intake-air quantity control section that executes a control over a turbo charge pressure of a turbo charger when the rich spike control execution determining section determines that the engine is under the execution of the rich spike control.

17. An air-fuel ratio control apparatus for an internal combustion engine having an EGR valve interposed in an EGR passage between an intake manifold and an exhaust manifold as claimed in claim 15, wherein the target EGR quantity calculating section comprises an engine driving detecting section that detects an engine driving condition and a target EGR rate calculating section that calculates a target EGR rate Megr on the basis of the detected engine driving condition and wherein the control execution section comprises an intake-air quantity control execution section that executes a control over a turbo charge pressure when the target EGR rate Megr is larger than a first predetermined value MEGRL# and when the rich spike control execution determining section does not determine that the engine is under the execution of the rich spike control.

18. An air-fuel ratio control apparatus for an internal combustion engine having an EGR valve interposed in an EGR passage between an intake manifold and an exhaust manifold as claimed in claim 17, wherein the control execution section comprises an EGR control section that executes a control over an EGR rate of the EGR valve when the target EGR rate is equal to or smaller than the first predetermined value MEGRL# and when the rich spike control execution determining section does not determine that the engine is under the execution of the rich spike control.

19. An air-fuel ratio control apparatus for an internal combustion engine having an EGR valve interposed in an EGR passage between an intake manifold and an exhaust manifold, comprising:

target EGR quantity calculating means for calculating a target EGR quantity;

control execution determining means for determining which of air-fuel ratio feedback controls through an EGR control and through an intake-air quantity is to be executed according to the target EGR quantity; and control execution means for selectively executing one of the air-fuel ratio feedback controls according to a result of a determination by the control execution determining means.

20. An air-fuel ratio control method for an internal combustion engine having an EGR valve interposed in an EGR passage between an intake manifold and an exhaust manifold, comprising:

calculating a target EGR quantity;

determining which of air-fuel ratio feedback controls through an EGR control and through an intake-air quantity is to be executed according to the target EGR quantity; and selectively executing one of the air-fuel ratio feedback controls according to a result of a determination of which of the air-fuel feedback controls is to be executed.

* * * * *